(12) United States Patent
Palsule et al.

(10) Patent No.: US 9,969,819 B2
(45) Date of Patent: May 15, 2018

(54) PRESSURE SENSITIVE ADHESIVE INCLUDING A 1,1-DISUBSTITUTED ALKENE COMPOUND

(71) Applicant: Sirrus, Inc., Loveland, OH (US)

(72) Inventors: Aniruddha Palsule, Cincinnati, OH (US); Alexander R. Holzer, Cincinnati, OH (US); Peter Rulon Stevenson, Salt Lake City, UT (US); Kshitij Kishen Parab, Loveland, OH (US); Jeffrey M. Sullivan, Goshen, OH (US)

(73) Assignee: Sirrus, Inc., Loveland, OH (US)

( * ) Notice: Subject to any disclaimer, the term of this patent is extended or adjusted under 35 U.S.C. 154(b) by 0 days. days.

(21) Appl. No.: 15/589,364

(22) Filed: May 8, 2017

(65) Prior Publication Data

US 2017/0253675 A1    Sep. 7, 2017

Related U.S. Application Data

(60) Division of application No. 14/966,247, filed on Dec. 11, 2015, now Pat. No. 9,676,875, which is a
(Continued)

(51) Int. Cl.
*C09J 7/38* (2018.01)
*C08F 2/06* (2006.01)
(Continued)

(52) U.S. Cl.
CPC .............. *C08F 2/06* (2013.01); *C08F 222/14* (2013.01); *C09J 135/02* (2013.01); *C09J 153/00* (2013.01)

(58) Field of Classification Search
None
See application file for complete search history.

(56) References Cited

U.S. PATENT DOCUMENTS 2,212,506 A    8/1940   Gustave et al.
2,245,567 A    6/1941   Brant et al.
(Continued)

FOREIGN PATENT DOCUMENTS

CN    102901754 A    1/2013
DE    19508049 A1    9/1996
(Continued)

OTHER PUBLICATIONS

K. Okamura and T. Date, A Facile Conversion of Ethoxydihydropyrans to 4-Cyanoethylisoxazoles, J. Heterocyclic Chem. 33, 383 (1996).
(Continued)

*Primary Examiner* — Vu A Nguyen
(74) *Attorney, Agent, or Firm* — Young Basile Hanlon & MacFarlane, P.C.

(57) ABSTRACT

The present teachings show that it is possible to polymerize 1,1-disubstituted alkene compounds in a solution (for example using one or more solvents). Polymerization of 1,1-disubstituted alkene compounds in an solution provides opportunities to better control the polymerization compared with bulk polymerization. The solution polymerization techniques can be employed for preparing homopolymers, copolymers (e.g., random copolymers), and block copolymers.

20 Claims, 6 Drawing Sheets

Related U.S. Application Data continuation of application No. 14/810,741, filed on Jul. 28, 2015, now Pat. No. 9,279,022, which is a continuation-in-part of application No. 14/789,178, filed on Jul. 1, 2015, now Pat. No. 9,249,265.

(60) Provisional application No. 62/186,479, filed on Jun. 30, 2015, provisional application No. 62/182,076, filed on Jun. 19, 2015, provisional application No. 62/047,328, filed on Sep. 8, 2014, provisional application No. 62/047,283, filed on Sep. 8, 2014.

(51) Int. Cl.
*C08F 222/14* (2006.01)
*C09J 153/00* (2006.01)
*C09J 135/02* (2006.01)

(56) References Cited

U.S. PATENT DOCUMENTS

| | | |
|---|---|---|
| 2,403,791 A | 7/1941 | D'Aiello |
| 2,277,479 A | 3/1942 | D'Aiello |
| 2,313,501 A | 3/1943 | Gustave |
| 2,330,033 A | 9/1943 | D'Aiello |
| 3,042,710 A | 7/1962 | Dickstein et al. |
| 3,197,318 A | 7/1965 | Kitazawa et al. |
| 3,203,915 A | 8/1965 | D'Aiello |
| 3,221,745 A | 12/1965 | Coover et al. |
| 3,427,250 A | 2/1969 | Haas et al. |
| 3,489,663 A | 1/1970 | Bayer et al. |
| 3,523,097 A | 8/1970 | Coover et al. |
| 3,557,185 A | 1/1971 | Ito et al. |
| 3,591,676 A | 7/1971 | Hawkins |
| 3,595,869 A | 7/1971 | Shuman |
| 3,677,989 A | 7/1972 | Jenkinson |
| 3,758,550 A | 9/1973 | Eck et al. |
| 3,923,836 A | 12/1975 | Bender et al. |
| 3,936,486 A | 2/1976 | Egger et al. |
| 3,940,362 A | 2/1976 | Overhurlts |
| 3,945,891 A | 3/1976 | Aal et al. |
| 3,966,562 A | 6/1976 | Mukushi et al. |
| 3,975,422 A | 8/1976 | Buck |
| 3,978,422 A | 8/1976 | Rheinfelder |
| 3,995,489 A | 12/1976 | Smith et al. |
| 4,001,345 A | 1/1977 | Gorton et al. |
| 4,004,984 A | 1/1977 | Margen |
| 4,018,656 A | 4/1977 | Rogers et al. |
| 4,035,243 A | 7/1977 | Katz et al. |
| 4,036,985 A | 7/1977 | Amato et al. |
| 4,046,943 A | 9/1977 | Smith et al. |
| 4,049,698 A | 9/1977 | Hawkins et al. |
| 4,056,543 A | 11/1977 | Ponticello |
| 4,079,058 A | 3/1978 | Ackermann et al. |
| 4,080,238 A | 3/1978 | Wolinski et al. |
| 4,083,751 A | 4/1978 | Choi et al. |
| 4,102,809 A | 7/1978 | Smith et al. |
| 4,105,688 A | 8/1978 | Arni et al. |
| 4,140,584 A | 2/1979 | Margen |
| 4,148,693 A | 4/1979 | Williamson |
| 4,154,914 A | 5/1979 | Kuraya |
| 4,160,864 A | 7/1979 | Ponticello et al. |
| 4,176,012 A | 11/1979 | Bryant |
| 4,186,058 A | 1/1980 | Katz et al. |
| 4,186,060 A | 1/1980 | Katz et al. |
| 4,198,334 A | 4/1980 | Rasberger |
| 4,224,112 A | 9/1980 | Childs |
| 4,229,263 A | 10/1980 | Childs |
| 4,236,975 A | 12/1980 | Childs |
| 4,237,297 A | 12/1980 | Rody et al. |
| 4,243,493 A | 1/1981 | Gruber et al. |
| 4,256,908 A | 3/1981 | Nishimura et al. |
| 4,282,067 A | 8/1981 | Katz et al. |
| 4,282,071 A | 8/1981 | Sherrod |
| 4,291,171 A | 9/1981 | Baum et al. |
| 4,313,865 A | 2/1982 | Teramoto et al. |
| 4,319,964 A | 3/1982 | Katz et al. |
| 4,329,479 A | 5/1982 | Yabutani et al. |
| 4,396,039 A | 8/1983 | Klenk et al. |
| 4,399,300 A | 8/1983 | Prange et al. |
| 4,411,740 A | 10/1983 | Flanigam et al. |
| 4,440,601 A | 4/1984 | Katz et al. |
| 4,440,910 A | 4/1984 | O'Connor |
| 4,443,624 A | 4/1984 | Prange et al. |
| 4,444,928 A | 4/1984 | Karrer |
| 4,450,067 A | 5/1984 | Angevine et al. |
| 4,503,074 A | 3/1985 | Friedman |
| 4,504,658 A | 3/1985 | Narisada et al. |
| 4,510,273 A | 4/1985 | Miura et al. |
| 4,517,105 A | 5/1985 | Laemmle et al. |
| 4,539,423 A | 9/1985 | Itatani et al. |
| 4,556,649 A | 12/1985 | Salzburg et al. |
| 4,560,723 A | 12/1985 | Millet et al. |
| 4,578,503 A | 3/1986 | Ishikawa et al. |
| 4,584,064 A | 4/1986 | Ciais et al. |
| 4,613,658 A | 9/1986 | Mathias et al. |
| 4,698,333 A | 10/1987 | Fauss et al. |
| 4,720,543 A | 1/1988 | McPherson et al. |
| 4,727,701 A | 3/1988 | Figari |
| 4,728,701 A | 3/1988 | Jarvis et al. |
| 4,736,056 A | 4/1988 | Smith et al. |
| 4,767,503 A | 8/1988 | Crescentini et al. |
| 4,769,464 A | 9/1988 | Sajtos |
| 4,783,242 A | 11/1988 | Robbins |
| 4,835,153 A | 5/1989 | Kabota et al. |
| 4,897,473 A | 1/1990 | Dombek |
| 4,914,226 A | 4/1990 | Di Trapani et al. |
| 4,931,584 A | 6/1990 | Bru-Magniez et al. |
| 4,932,584 A | 6/1990 | Yamazaki et al. |
| 5,021,486 A | 6/1991 | Galbo |
| 5,039,720 A | 8/1991 | Saatweber et al. |
| 5,064,507 A | 11/1991 | O'Donnell |
| 5,142,098 A | 8/1992 | Bru-Magniez et al. |
| 5,162,545 A | 11/1992 | Etzbach et al. |
| 5,210,222 A | 5/1993 | O'Murchu |
| 5,227,027 A | 7/1993 | Topper |
| 5,246,203 A | 9/1993 | McKnight et al. |
| 5,259,835 A | 11/1993 | Clark et al. |
| 5,284,987 A | 2/1994 | Sikkenga et al. |
| 5,292,937 A | 3/1994 | Manning et al. |
| 5,328,687 A | 4/1994 | Leung et al. |
| 5,312,864 A | 5/1994 | Wenz et al. |
| 5,334,747 A | 8/1994 | Steffen |
| 5,426,203 A | 6/1995 | Sohn et al. |
| 5,446,195 A | 8/1995 | Pacifici |
| 5,514,371 A | 5/1996 | Leung et al. |
| 5,514,372 A | 5/1996 | Leung et al. |
| 5,550,172 A | 8/1996 | Regula et al. |
| 5,565,525 A | 10/1996 | Morimoto et al. |
| 5,567,761 A | 11/1996 | Song |
| 5,575,997 A | 11/1996 | Leung et al. |
| 5,582,834 A | 12/1996 | Leung et al. |
| 5,624,669 A | 4/1997 | Leung et al. |
| 5,693,621 A | 12/1997 | Toepfer et al. |
| 5,817,742 A | 10/1998 | Toepfer et al. |
| 5,817,870 A | 10/1998 | Haas et al. |
| 5,886,219 A | 3/1999 | Steffen |
| 5,902,896 A | 5/1999 | Bauer |
| 5,952,407 A | 9/1999 | Rasoul et al. |
| 6,069,261 A | 5/2000 | Hoffmann et al. |
| 6,106,807 A | 8/2000 | Albayrak et al. |
| 6,143,352 A | 11/2000 | Clark et al. |
| 6,183,593 B1 | 2/2001 | Narang et al. |
| 6,210,474 B1 | 4/2001 | Romano, Jr. et al. |
| 6,211,273 B1 | 4/2001 | Bru-Magniez et al. |
| 6,225,038 B1 | 5/2001 | Smith et al. |
| 6,238,896 B1 | 5/2001 | Ozaki et al. |
| 6,245,933 B1 | 6/2001 | Malofsky et al. |
| 6,284,915 B2 | 9/2001 | Hirase et al. |
| 6,291,703 B1 | 9/2001 | Schaerfl et al. |
| 6,376,019 B1 | 4/2002 | Leung |
| 6,395,737 B1 | 5/2002 | Defossa et al. |
| 6,395,931 B1 | 5/2002 | Carvalho et al. |
| 6,413,415 B1 | 7/2002 | Weiss et al. |
| 6,420,468 B2 | 7/2002 | Bru-Magniez et al. |

(56) References Cited

U.S. PATENT DOCUMENTS

| | | | |
|---|---|---|---|
| 6,440,461 B1 | 8/2002 | Bru-Magniez et al. | |
| 6,512,023 B1 | 1/2003 | Malofsky et al. | |
| 6,518,677 B1 | 2/2003 | Capote | |
| 6,545,097 B2 | 4/2003 | Pinchuk et al. | |
| 6,559,264 B1 | 5/2003 | Konig et al. | |
| 6,610,078 B1 * | 8/2003 | Bru-Magniez ......... | A61L 24/06 128/898 |
| 6,613,934 B1 | 9/2003 | Jegelka et al. | |
| 6,673,957 B2 | 1/2004 | Bartek et al. | |
| 6,699,928 B2 | 3/2004 | Cobbley et al. | |
| 6,716,355 B1 | 4/2004 | Hanemaaijer et al. | |
| 6,750,298 B1 | 6/2004 | Bru-Magniez et al. | |
| 6,794,365 B2 | 9/2004 | Al-Obeidi et al. | |
| 6,841,064 B1 | 1/2005 | Weiss et al. | |
| 6,936,140 B2 | 8/2005 | Paxton et al. | |
| 7,070,675 B2 | 7/2006 | Schmidt et al. | |
| 7,109,369 B2 | 9/2006 | Nose et al. | |
| 7,208,621 B2 | 4/2007 | Nose et al. | |
| 7,226,957 B1 | 6/2007 | Scranton et al. | |
| 7,305,850 B2 | 12/2007 | Tonkovich et al. | |
| 7,553,989 B2 | 6/2009 | Sawabe et al. | |
| 7,603,889 B2 | 10/2009 | Cypes et al. | |
| 7,610,775 B2 | 11/2009 | Tonkovich et al. | |
| 7,649,108 B2 | 1/2010 | Schal et al. | |
| 7,659,423 B1 | 2/2010 | McArdle | |
| 7,663,000 B2 | 2/2010 | Dekkers et al. | |
| 7,771,567 B2 | 8/2010 | Rives et al. | |
| 7,900,558 B2 | 3/2011 | Yokoi | |
| 8,609,885 B2 | 12/2013 | Malofsky et al. | |
| 8,884,051 B2 | 11/2014 | Malofsky et al. | |
| 9,108,914 B1 | 8/2015 | Malofsky et al. | |
| 9,181,365 B2 | 11/2015 | Malofsky et al. | |
| 9,217,098 B1 | 12/2015 | Stevenson et al. | |
| 9,221,739 B2 | 12/2015 | Malofsky et al. | |
| 9,234,107 B2 | 1/2016 | Malofsky et al. | |
| 9,334,430 B1 | 5/2016 | Stevenson et al. | |
| 2001/0005572 A1 | 6/2001 | Lobo et al. | |
| 2001/0034300 A1 | 10/2001 | Yurugu et al. | |
| 2002/0035231 A1 | 3/2002 | Whitehouse et al. | |
| 2002/0143128 A1 | 10/2002 | Cabioch et al. | |
| 2002/0151629 A1 | 10/2002 | Buffkin et al. | |
| 2003/0096069 A1 | 5/2003 | D'Alessio | |
| 2003/0199655 A1 | 10/2003 | Yurugi et al. | |
| 2004/0057914 A1 | 3/2004 | Bonda et al. | |
| 2004/0076601 A1 | 4/2004 | Bru-Magniez et al. | |
| 2004/0082043 A1 | 4/2004 | Yadav et al. | |
| 2004/0220060 A1 | 11/2004 | Bartley et al. | |
| 2006/0167267 A1 | 7/2006 | Chorghade et al. | |
| 2006/0211809 A1 | 9/2006 | Kodemura et al. | |
| 2007/0043145 A1 | 2/2007 | Beck et al. | |
| 2007/0049655 A1 | 3/2007 | Yoshimune et al. | |
| 2007/0092483 A1 | 4/2007 | Pollock | |
| 2007/0120630 A1 | 5/2007 | Huang et al. | |
| 2007/0238872 A1 | 10/2007 | Sabesan | |
| 2008/0131618 A1 | 6/2008 | Nakamura et al. | |
| 2008/0138418 A1 | 6/2008 | Lee et al. | |
| 2008/0160305 A1 | 7/2008 | Warren et al. | |
| 2008/0187655 A1 | 8/2008 | Markle et al. | |
| 2008/0227919 A9 | 9/2008 | Li et al. | |
| 2008/0241485 A1 | 10/2008 | Shimohara et al. | |
| 2008/0286333 A1 | 11/2008 | Kangas et al. | |
| 2009/0203861 A1 | 8/2009 | Lee et al. | |
| 2009/0263604 A1 | 10/2009 | Arai et al. | |
| 2010/0016508 A1 | 1/2010 | Sasagawa et al. | |
| 2010/0256720 A1 | 10/2010 | Overstreet et al. | |
| 2010/0286433 A1 | 11/2010 | Malofsky et al. | |
| 2010/0286438 A1 | 11/2010 | Malofsky et al. | |
| 2011/0015406 A1 | 1/2011 | Umentani et al. | |
| 2011/0024392 A1 | 2/2011 | Sato et al. | |
| 2011/0164322 A1 | 7/2011 | Morozumi et al. | |
| 2012/0083523 A1 | 4/2012 | Richard et al. | |
| 2012/0136130 A1 | 5/2012 | Takashima et al. | |
| 2012/0203021 A1 | 8/2012 | Friese et al. | |
| 2013/0019520 A1 | 1/2013 | Sello et al. | |
| 2013/0281580 A1 | 10/2013 | Malofsky et al. | |
| 2013/0303719 A1 | 11/2013 | Malofsky et al. | |
| 2013/0324754 A1 | 12/2013 | Bredsguard | |
| 2014/0058031 A1 | 2/2014 | Overbeek et al. | |
| 2014/0248485 A1 | 9/2014 | Malofsky et al. | |
| 2014/0275400 A1 | 9/2014 | Chen et al. | |
| 2014/0288230 A1 | 9/2014 | Malofsky et al. | |
| 2014/0329980 A1 | 11/2014 | Malofsky et al. | |
| 2015/0056879 A1 | 2/2015 | Malofsky et al. | |
| 2015/0073110 A1 | 3/2015 | Malofsky et al. | |
| 2015/0104660 A1 | 4/2015 | Malofsky et al. | |
| 2015/0148480 A1 | 5/2015 | Ellison et al. | |
| 2015/0210894 A1 | 7/2015 | Malofsky et al. | |
| 2015/0303122 A1 | 10/2015 | Malofsky et al. | |
| 2015/0361283 A1 | 12/2015 | Malofsky et al. | |

FOREIGN PATENT DOCUMENTS

| | | |
|---|---|---|
| EP | 2768917 A2 | 2/2009 |
| FR | 2788516 A1 | 7/2000 |
| GB | 432628 A | 7/1935 |
| GB | 965676 | 8/1964 |
| GB | 965767 | 8/1964 |
| GB | 975733 | 11/1964 |
| JP | S56-081537 A | 7/1981 |
| JP | H02-281013 A | 11/1990 |
| JP | H08231564 | 9/1996 |
| JP | 09258448 A | 10/1997 |
| JP | 200019936 | 7/2000 |
| JP | 2003201397 A | 7/2003 |
| JP | 2008/174494 | 1/2007 |
| WO | 1999/046619 | 9/1999 |
| WO | 99/055394 A1 | 11/1999 |
| WO | 2007/120630 A2 | 10/2007 |
| WO | 2010/129068 A1 | 11/2010 |
| WO | 2011/059104 A1 | 5/2011 |
| WO | 2011/161045 A1 | 12/2011 |
| WO | 2012/054616 A2 | 4/2012 |
| WO | 2012/054633 A2 | 4/2012 |
| WO | 2013/059473 A2 | 4/2013 |
| WO | 2013/066629 A2 | 5/2013 |
| WO | 2013/149165 A1 | 10/2013 |
| WO | 2013/149168 A1 | 10/2013 |
| WO | 2013/149173 A1 | 10/2013 |

OTHER PUBLICATIONS

NPL Yamauchi et al. Tetrahedron Asymetry 12, (2001), 3113-3118.

McCoy, M. "A New Way to Stick" Chemical & Engineering News, vol. 92, Issue 26, Jun. 30, 2014, pp. 17-18, paragraph [2].

Bachman et al., "Diethyl Methylenemalonate" Contirbution from the Research Laboratories of the Eastman Kodak Company, May 17, 1939, pp. 493-501.

"Knoevenagel reaction on a molecular sieve", Li Qifang et al., Chinese Science Bulletin, vol. 12, pp. 914-917.

"Knoevenagel Condensation Over Acidic Zeolite", Zuo Bojun et al., Chinese Journal of Catalysis, vol. 23 (6), pp. 555-558.

"Comparison of the catalytic activity of MOFs and zeolites in Knoevenagel condensation", Maksym Opanasenko, et al., Catalysis Science & Technology, vol. 3 p. 500-507.

Corey et al. "Total Synthesis of Gibberellic Acid. A Simple Synthesiss of a Key Intermediate", J. Am. Chem. Soc. 1982, 104, 6129-6130.

Krishna et al. "Stereodefined Access to 3-Deoxy Sugars Through a Tandem Baylis-Hillman and Lewis Acid Catalyzed Sequence", European Journal of Organic Chemistry, 2010, 813-817.

"Esterification of Sludge Palm Oil Using Trifluromethanesulfonic Acid for Preparation of Biodiesel Fuel", Korean Journal of Chemical Engineering, Jun. 2013, vol. 30, issue 6, pp. 1229-1234.

Gill, Charansingh, et al. "Knoevenagel condensation in neutral media: A simple and efficient protocol for the synthesis of electrophillic alkenes catalyzed by anhydrous ferric sulphate with remarkable reusability." Bulletin of the Catalysis Society of India 7 (2008): 153-157.

Kütt et al., "Equilibrium Acidities of Superacids," Journal of Organic Chemistry, vol. 76, No. 2, 2011, pp. 391-395, published on the web Dec. 17, 2010.

(56) References Cited

OTHER PUBLICATIONS

M. Matziari et al. Active Methylene Phosphinic Peptides: A new Diversification Approach Organic Letters 2006 vol. 8, No. 11 pp 2317-2319 May 5, 2006.

March, *Advanced Organic Chemistry*, 2d Ed, section 0-25, pp. 365-367, 1977, McGraw Hill, New York, New York.

Morrison and Boyd, *Organic Chemistry*, 4th Ed., pp. 831 and 836-838, 1983, Allyn Bacon, Inc., Boston, MA.

Olah et al., "Superelectrophilic Solvation," Accounts of Chemical Research, Apr. 2004, vol. 37, No. 4.

Otera et al., "Esterification: Methods, Reactions, and Applications", 2nd Ed., pp. 55-58, 2010, Wiley-VCH Verlag Gmbh & Co. KGaA. Weinheim, Germany.

Transsesterification of diethyl malonate with Benzyl Alcohol Catalyzed by Modified Zirconia: Kinetic Study, Journal of Molecular Catalysis A: Chemical, vol. 391, Sep. 2014, pp. 55-65.

Larras et al. Synthesis and micellization of amphiphilic poly(ethylene oxide)-block-poly(methylidene malonate 2.1.2.) diblock copolymers Macromol. Rapid Commun. dated2000, vol. 21, pp. 1089-1029.

A. C. Cope: "Condensation Reactions. I. The Condensation of Ketones with Cyanoacetic Esters and the Mechanism of the Knoevenagel Reaction," Condensation of Ketones with Cyanoacetic Esters, (1937), vol. 59, pp. 2327-2330.

A. M. Vetrova et al.: "Improvement of the Thermal Stability of Cyanoacrylate Adhesives," Polymer Science, Series D, (2009), vol. 2, No. 1, pp. 27-30.

Alejandro Bugarin et al. "Efficient direct [alpha]-methylenation of carbonyls mediated by dissopropylammonium trifluoroacetate", Chemical Communications, vol. 46, No. 10 dated Jan. 25, 2010.

Australian Patent Examination Report No. 1, Application No. 2011317050, dated Jan. 9, 2015.

B. C. Ranu et al.: "Ionic Liquid as Catalyst and Reaction Medium—a Simple, Efficient and Green Procedure for Knoevenagel Condensation of Aliphatic and Aromatic Carbonyl Compounds Using a Task-Specific Basic Ionic Liquid," Euro. J. Org <http://Euro.J.Org>. Chem., (2006), pp. 3767-3770.

Block, "Diethyl bis (hydroxymethyl) malonate" Organic Syntheses, 1973, Coll. vol. 5, p. 381 [vol. 40, p. 27 (1960); Retrieved on Apr. 4, 2014 from internet: http://www.Orgsyn.org/content/pdfs/procedures/cv5p0381.pdf] p. 381, para 1.

C. Gill et al.: "Knoevenagel Condensation in Neutral Media: A simple and efficient protocol for the Synthesis of Electrophillic alkenes Catalyzed by Anhydrous Ferric Sulphate with Remarkable Reusability," Department of Chemistry, Dr. Babasaheb Ambedkar Marathwada University, Aurangabad 431 004 (MS), India, (n/a), pp. n/a.

Christoph Schotes et al. "Cu(I)- and C(II)-Catalyzed Cyclo- and Michael Addition Reactions of Unsaturated [beta]-Ketoesters" The Journal of Organic Chemistry, vol. 76, No. 14 dated Jul. 15, 2011 p. 5862-5866.

Copending PCT Patent Application No. PCT/US2015/048846 filed on Sep. 8, 2015.

Copending U.S. Appl. No. 14/789,178, filed Jul. 1, 2015.

European Extended Search Report for Application No. PCT/2011056926 dated May 27, 2015.

G. Lai et al.: "Ionic Liquid Functionalized Silica Gel: Novel Catalyst and Fixed Solvent," Tetrahedron Letters (2006), vol. 47, pp. 6951-6953.

H, A, Oskooie et al.: "On Water: an Efficient Knoevenagel Condensation using 12-Tungstophosphoric Acid as a Reusable Green Catalyst," Synthetic Communications, (2006), vol. 36, pp. 2819-2823.

H. Hoffman et al. "Preparation and Selected Reaction of tery-Butyl 2-Methylene-3-oxoalkanoates" Chem. Ber., vol. 124 dated Jan. 1, 1991, pp. 2475-2480.

H. Jiang et al.: "Inorganic Zinc Salts Catalyzed Knoevenagel Condensation at Room Temperature without Solvent," Preparative Biochemistry & Biotechnology, (2009), vol. 39, pp. 194-200.

H. Jung et al,: "New and General Methods for the Synthesis of Arylmethylene Bis(3-Hydroxy-2-Cyclohexene-1-0nes) and Xanthenediones by EDDA and In(OTf)3-Catalyzed One-Pot Domino Knoevenagei/Michael or Koevenagei/Michael/ Cyclodehydration Reactions," Bull. Korean Chem. Soc. (2009) vol. 30, No. 9, pp. 1989-1995.

International Search Report and Written Opinion for PCT Application No. PCT/US2011/56926 dated Feb. 28, 2012.

J. R. Harjani et al.: "Lewis Acidic Ionic Liquids for the Synthesis of Electrophilic Alkenes; via the Knoevenagel Condensation," Tetrahedron Letters, (2002), vol. 43, pp. 1127-1130.

J. S. Yadav et al.,: "Phosphane-Catalyzed Knoevenagel Condensation: a Facile Synthesis of a-Cyanoacrylates and a-Cyanoacrylonitriles," Eur, J, Org, Chem. (2004), pp. 546-551.

Juliana Vale et al. "Efficient [alpha]-Methylenation of Carbonyl Compounds in Ionic Liquids at Room Temperature", Synlett, vol. 2009, No. 01, Jan. 1, 2009 (Jan. 1, 2009), pp. 75-78, XP055170349, ISSN: 0936-5214, DOI: 10.1055/s-0028-1087389 *table 2; compound 3 *.

Lawrence N J et al. "Reaction of Baylis-Hillman products with Swern and Dess-Martin oxidants", Tetrahedron Letters, Pergamon, GB, vol. 42 No. 23 dated Jun. 4, 2001, pp. 3939-3941.

Limouzin et al., "Anionic Polymerization of n-Butyl Cyanoacrylate in Emulsion and Miniemulsion" Macromolecules, vol. 36, 2003, pp. 667-674.

M. Ware et al.: "DBU: An Efficient Catalyst for Knoeveganel Condensation under Solvent-free Condition," Bulletin of the Catalysis Society of India, (2007), vol. 6, pp. 104-106.

M. Yamauchi et al. "Reactivity of 2-Methylene-1, 3-dicarbonyl Compounds. 1,3-Dipolar Cycloaddition Reaction with Ethyl Diazoacetate", Chem. Pham. Bull., vol. 49, No. 12, dated Jan. 1, 2001, pp. 1638-1639.

Magdalini Matziari et al: "Active methylene phosphinic peptides: a new diversification approach", Organic Letters., vol. 8, No. 11, 2006, pp. 2317-2319, USACS, Washington, DC. ISSN: 1523-7060.

McNab, Kirk-Othmer Encyclopedia of chemical Technology, Pyrolysis, Flash Vacuum, 2009, John Wiley & Sons, Inc., pp. 1-26.

Office Action, U.S. Appl. No. 14/789,178 dated Oct. 14, 2015.

P, Ballesteros et al.: "D I-tert-Butyl Methylenemalonate [Propanedioic Acid, Methylene-, bis( 1,1-dimethylethyl)esterl," Or!=)anic Synthesis. Coli. (1990), vol. 7, p. 142; (1986) vol. 64, p. 63.

P. Ballesteros et al.: "Synthesis of DI-tent-Butyl Methylenemalonate, a Sterically Hindered 1,1-Dicarbonyl Alkene," J. Ora <htto://J.Ora>. Chem, (1983), vol. 48, pp. 3603-3605.

P. Breton et al., "New Poly(Methylidudene Malonate 2.1.2) Nanoparticles: Recent Developments", Targeting of Drugs 4, NATO ASI Series, vol. 273, pp. 161-172, 1994.

P. Klemarczyk: "Adhesion Studies of Mixtures of Ethyl Cyanoacrylate with a Difunctional Cyanoacrylate Monomer and with other Electron-deficient Olefins," J. Adhesion, (1999), vol. 69, pp. 293-306.

P. Klemarwczyk: "A General Synthesis of 1,1 Disubstituted Electron Deficient Olefins and their Polymer Properties," Polymer,—(1998), vol. 39, No. I, pp. 173-181.

Reddy et al. "An easy-to-use heterogeneous promoted zirconia catalyst for Knoevenagel condensation in liquid phase under solvent-free conditions." Journal of Molecular Catalysts A: Chemical 258 (2006) pp. 302-307.

T. Doi et al.: "Synthesis of Dimethyl gloiosiphne A by Way of Palladium-Catalyzed Domino Cyclization," T. Ora <htto://T.Ora>. Chem., (2007), vol. 72, pp. 3667-3671.

Takagi et al.: Kogyo Kagaku Zasshi, Reaction of Active Methylene Radicals with Formaldehyde. L. Synthesis of Diethyl Methylenemalonate, 1953, vol. 56, pp. 901-903, English abstract.

V. G. Nenajdenko et al.: "Reaction of 2-Methylene-1 ,3-Dicarbonyl Compounds Containing a CF3-Group with 1 ,3-Dienes," Tetrahedron, (2000), vol. 56, pp. 6549-6556.

Yamauchi et al. *A Facile Conversion of Ethoxydihydropyrans to 4-Cyanoethylisoxazoles*, Mar.-Apr. 1996, pp. 383-387.

Yamauchi et al. *Reactivity of 2-Methylene-1,3-Dicarbonyl Compounds: Catalytic Enantioselective Diels-Alder Reaction* dated 2001, pp. 3113-3118.

(56) References Cited

OTHER PUBLICATIONS

Zaragoza Dorwald, Side Reactions in Organic Synthesis, 2005, Wiley-VCH Verlag GmbH & Co., KgaA, Weinheim, Preface. p. IX.

* cited by examiner

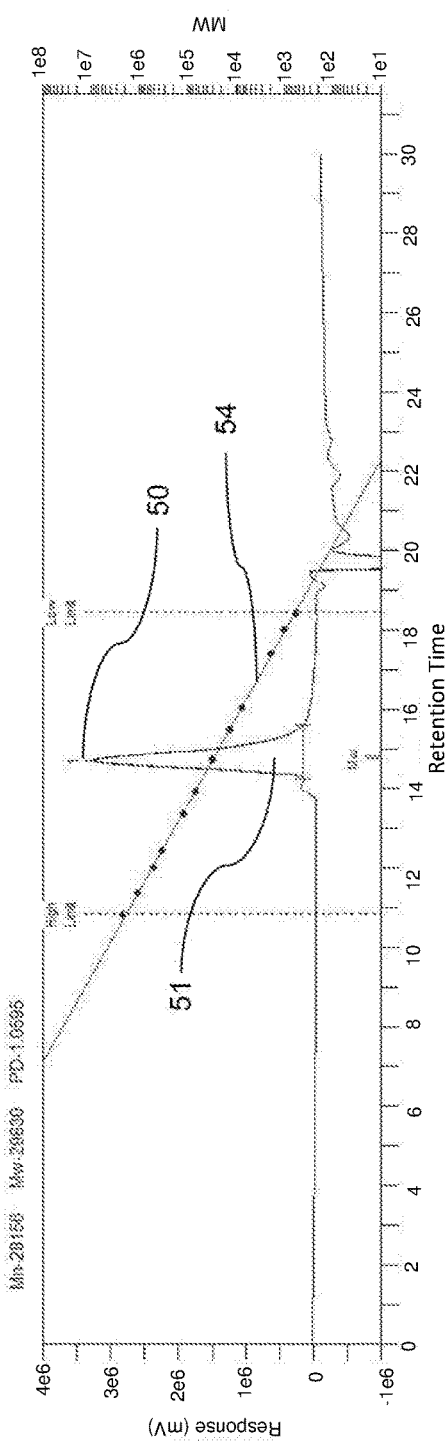
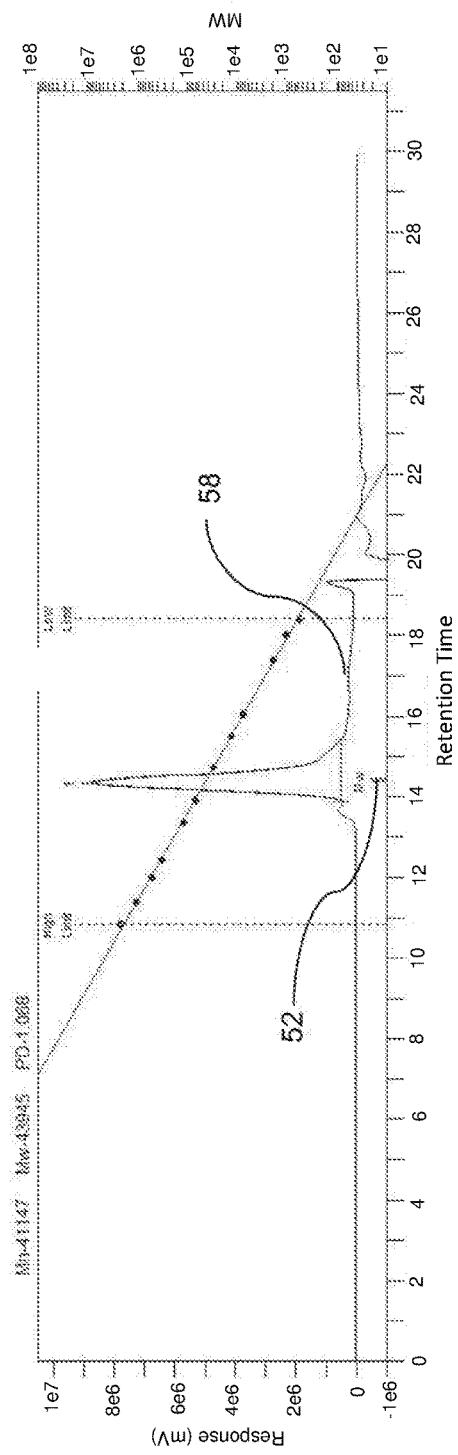
FIG. 5A
FIG. 5B

PRESSURE SENSITIVE ADHESIVE INCLUDING A 1,1-DISUBSTITUTED ALKENE COMPOUND

CLAIM OF PRIORITY

The present application is a divisional patent application of U.S. patent application Ser. No. 14/966,247 filed on Dec. 11, 2015. The present application claims priority to U.S. patent application Ser. No. 14/966,247 filed on Dec. 11, 2015, U.S. patent application Ser. No. 14/810,741 filed on Jul. 8, 2015 (granted as U.S. Pat. No. 9,279,022), U.S. patent application Ser. No. 14/789,178 filed on Jul. 1, 2015 (granted as U.S. Pat. No. 9,249,265), and U.S. Provisional Patent Applications No. 62/186,479 filed on Jun. 30, 2015, 62/182,076 filed on Jun. 19, 2015, 62/047,283 filed on Sep. 8, 2014, and 62/047,328 filed on Sep. 8, 2014, each incorporated herein by reference in its entirety.

RELATED PATENT APPLICATIONS

The present patent application is related to U.S. patent application Ser. No. 14/966,409 field on Dec. 11, 2015, Ser. No. 15/467,330 filed on Mar. 23, 2017, Ser. No. 15/467,597 filed on Mar. 23, 2017, and Ser. No. 15/509,403 filed on Mar. 7, 2017.

FIELD

The teachings herein are directed at polymers including one or more 1,1-disubstituted alkene compounds having a hydrocarbyl group bonded to the carbonyl groups through a direct bond or through an oxygen atom, methods for preparing the polymers in solution, compositions including the polymers, and the use of the polymers. The polymers may be homopolymers consisting essentially of (e.g., about 99 weight percent or more) or entirely of a single monomer or may be copolymers including two or more monomers (e.g., a random copolymer or a block copolymer having a plurality of polymer blocks). The polymer preferably is prepared by anionic polymerization of one or more reactive 1,1-disubstituted alkene monomers in solution.

BACKGROUND

Polymerization of 1,1-disubstituted alkene compounds are typically performed in bulk state, and frequently in situ, such as when monomer is placed between two substrates to be adhered. The resulting polymerization process may be difficult to control resulting in variable performance or mechanical properties. For example, the polymerization process may be characterized by one or more spikes in temperature during the polymerization process, such as by an increase in temperature of about 15° C. or more, about 30° C. or more, or even about 45° C. or more (e.g., during a polymerization reaction). Such an increase in temperature may occur in a short time period (e.g., less than 10 minutes, less than 3 minutes, or even less than 1 minute). Typically, the resulting polymer may be characterized by one or more of the following: a generally high level of branching, a high polydispersity index, a high concentration of non-polymer reaction products, a high concentration of monomers and/or oligomers, or a generally high viscosity. For example, when polymerized in bulk, the resulting polymer may have a high viscosity that makes further processing, handling, or polymerization difficult.

As used herein, bulk polymerization refers to the polymerization of a polymerizable composition including one or more monomers where the concentration of the one or more monomers is about 80 weight percent or more, preferably about 90 weight percent or more (e.g., about 100 weight percent), based on the total weight of the compounds in the polymerizable composition that are liquid at room temperature. These polymerizations typically also require an input of energy either in the form of heat or radiation to initiate polymerization.

Free radical polymerization of dialkyl methylene malonate monomers using heat, UV light and peroxide is described in U.S. Pat. Nos. 2,330,033 and 2,403,791, both incorporated herein by reference. In these patents, the monomer was prepared using traditional methods which results in low purity monomer. The polymer examples in these patents are all prepared via bulk polymerization. One would therefore not expect to be able to control polymer properties, such as molecular weight and molecular weight distribution.

However, while earlier methods for producing certain methylene malonates have been known in the art, these prior methods suffer significant deficiencies that preclude their use in obtaining commercially viable monomers. Such deficiencies include unwanted polymerization of the monomers during synthesis (e.g., formation of polymers or oligomers or alternative complexes), formation of undesirable side products (e.g., ketals or other latent acid-forming species which impede rapid polymerization), degradation of the product, insufficient and/or low yields, and ineffective and/or poorly functioning monomer product (e.g., poor adhesive characteristics, stability, or other functional characteristics), among other problems. The overall poorer yield, quality, and chemical performance of the monomer products formed by prior methods have impinged on their practical use in the production of the above commercial and industrial products.

Polymerization of 1,1-disubstituted alkene compounds using anionic polymerization processes are useful in the bulk polymerization of 1,1-disubstituted alkene compounds and processes which can operate at or near ambient conditions (starting conditions) have been disclosed. Such anionic bulk polymerizations may be initiated using a wide range of initiators, and may even be initiated by contact with certain substrates. Other bulk polymerization reactions may be initiated by UV light. However, as discussed above, the bulk polymerization may limit the ability to control the structure of the polymer molecules and/or to be able to easily handle the resulting polymer composition or product. These difficulties in bulk polymerization may be particularly pronounced when manufacturing large quantities of polymer, where heat transport issues may occur, especially when there may be shear heat generated by the flow of the high viscosity polymer and/or heat emitted due to the inherent exothermic nature of the polymerization.

Bulk polymerization of 1,1-disubstituted alkene compounds also present a challenge when attempting to control the structure of the polymer by including one or more comonomers. For example, the high viscosity of the intermediate polymer may present difficulties in preparing a block copolymer (such as by sequential addition of a first monomer system followed by a second monomer system into a reaction vessel). Other problems may arise when attempting to control the structure of a random copolymer, where the reaction rates of the different monomers differ so that the monomers are not uniformly distributed along the length of the polymer molecular. For example, copolymers including one or more 1,1-disubstituted alkene compounds prepared by bulk polymerization are typically expected to have a generally blocky sequence distribution and/or result in polymer molecules having a broad distribution of monomer compositions. As used herein, a copolymer having a generally blocky sequence distribution of monomers may be characterized as having a blockiness index of about 0.7 or less, about 0.6 or less or about 0.5 or less, or about 0.4 or less.

Although solution polymerization processes have been employed in free radical polymerization process to better control the polymer architecture, such processes have not generally been employed in anionic polymerization of 1,1-disubstituted alkenes.

When a solution polymerization system is employed with anionic polymerization methods, sub-ambient temperatures (e.g., less than 10° C., less than 0° C., or less than −20° C. are typically required to control the reaction. As such, in solution polymerization systems it may be necessary to use a cooling systems and/or insulation for achieving and/or maintain such a low reaction temperature.

Additional difficulties in polymerization of 1,1-disubstituted alkene compounds arise from the possibility of the anionic group of the growing polymer reacting with an acid thereby terminating the reaction. Therefore, one would avoid using an acid in polymerizing 1,1-disubstituted alkene compounds using anionic polymerization.

Prior attempts at anionic polymerization processes (e.g., bulk polymerization processes) for 1,1-disubstituted alkene compounds generally have had one or more of the following drawbacks: (1) requirement that the systems have low polymer concentrations; (2) have lacked reproducibility for controlling molecular weight distribution, or (3) have undesirable reactant by-products.

There is a need for polymerization methods, systems, and resulting polymer compositions or products that allow for improved control of one or more of the following properties of a polymer containing one or more 1,1-disubstituted alkene compounds: the weight average molecular weight, the number average molecular weight, the polydispersity index, the zero-shear viscosity of the polymer (e.g., at one or more temperatures of at least about 20° C. above the melting temperature of the polymer), the viscosity of the polymer system (e.g., the bulk polymer or the polymer solution) at room temperature, the sequence distribution of monomers in a random copolymer, or having at least two different polymer blocks covalently bonded (e.g., each containing one or more 1,1-disubstituted alkene compounds). There is also a need for polymerization process which can be scaled-up (e.g., to a reactor of about 20 liters or more, or having a throughput of about 10 kg of polymer per hour or more. There is also a need for processes that result in a solution containing the polymer. Such solutions may be useful for applications such as paints, coatings, finishes, polishes, and adhesives. For example, there may be a need for process and polymer systems that result in a solution having a controlled viscosity and/or polymer concentration.

SUMMARY

One aspect of the disclosure is directed at a process comprising the steps of: mixing two or more monomers (including a first monomer that is a 1,1-disubstituted alkene compound, and a second monomer different from the first monomer) and a solvent; adding an activator; reacting the activator with the one of the two or more monomers (e.g., with the first monomer, or with the second monomer) for initiating the anionic polymerization of the two or more monomers; and anionically polymerizing the two or more monomers to form a polymer having a weight average molecular weight and/or a number average molecular weight of about 2000 daltons or more (preferably about 3000 daltons or more), the polymer including the first monomer and the second monomer. The second monomer may be a 1,1-disubstituted alkene compound or a different monomer capable of copolymerizing with the first monomer. Preferably the polymer is a random copolymer. The concentration of the solvent typically is about 25 weight percent or more, based on the total weight of the solvent and the two or more monomers.

Another aspect of the disclosure is directed at a process comprising the steps of: mixing at least a first monomer and a solvent to form a solution including the first monomer and the solvent; wherein the first monomer is a first 1,1-disubstituted alkene compound; adding an initiator; anionically polymerizing the first monomer in the presence of the solvent to form a first polymer block including the first 1,1-disubstituted alkene compound and having a weight average molecular weight or a number average molecular weight of about 1000 daltons or more, wherein the first polymer block has a reactive end; after polymerizing the first polymer block, adding at least a second monomer to the solvent to form a solution including the second monomer and the solvent, wherein the second monomer is different from the first monomer (e.g., the second monomer is a second 1,1-disubstituted alkene compound different from the first 1,1-disubstituted alkene compound; reacting the second monomer to the reactive end of the first polymer block; and anionically polymerizing the second monomer to form a second polymer block. The second polymer block includes the second monomer and preferably has a weight average molecular weight or number average molecular weight of about 1000 daltons or more. The second polymer block may have a reactive end. The second polymer block has a composition different from the composition of the first polymer block. The concentration of the solvent typically is about 25 weight percent or more, based on the total weight of the solvent and the two or more monomers. The block copolymer may be a diblock copolymer or may have one or more additional polymer blocks (e.g., 3 or more blocks). The first polymer block and/or the second polymer block may include one or more additional monomers (e.g., different from the first 1,1-disubstituted alkene compound, and different from the second monomer).

Another aspect of the disclosure is directed at a process comprising the steps of: mixing one or more monomers (including a first monomer that is a 1,1-disubstituted alkene compound) and a solvent; adding an activator; reacting the activator with one of the one or more monomers (e.g., with the first monomer) for initiating the anionic polymerization of the one or more monomers; and anionically polymerizing the one or more monomers to form a polymer having a weight average molecular weight and/or a number average molecular weight of about 2000 daltons or more, the polymer including the first monomer, wherein the first monomer is provided as a high purity monomer having a purity of about 95 weight percent or more. Preferably the high purity monomer has a purity of about 97 weight percent, even more preferably about 99 weight percent. For example, the high purity monomer may include the 1,1-disubstituted alkene compound having an alkene group and the total concentration of any analogous compound (i.e., impurity compound) having the alkene group replaced by hydroxyalkyl group is about 3 mole percent or less (preferably about 1 mole percent or less, even more preferably about 0.1 mole percent or less, and most preferably about 0.01 mole percent or less), based on the total moles of the 1,1-disubstituted alkene compound. The concentration of the solvent typically is about 25 weight percent or more, based on the total weight of the solvent and the two or more monomers.

Another aspect of the disclosure is directed at a polymer including one or more 1,1-disubstituted alkene monomers. The polymer may be prepared using a solution polymerization reaction, such as a reaction according to the teachings herein.

Another aspect of the disclosure is directed at a polymeric composition comprising (1) a polymer including one or more 1,1-disubstituted alkene monomers and (2) one or more additives.

Another aspect of the disclosure is directed at a system for polymerizing one or more monomers including a reactor having an agitation device for mixing a monomer and a solvent; about 25 weight percent or more solvent; and about 2 weight percent or more of one or more monomers including one or more 1,1-disubstituted alkenes. Preferably the agitation device includes a stirring device. The system preferably includes an activator(s) for initiating anionic polymerization of 1,1-disubstituted alkenes.

Another aspect of the disclosure is directed at a block copolymer having a first polymer block including a first primary monomer that is a 1,1-disubstituted alkene compound, wherein the first primary monomer is present at a concentration of about 50 weight percent or more, based on the total weight of the first polymer block, the first polymer block covalently bonded to a second polymer block including a second primary monomer different from the first primary monomer, wherein the second primary monomer is present at a concentration of about 50 weight percent or more, based on the total weight of the second polymer block.

Another aspect of the disclosure is directed at a low molecular weight polymer having a number average degree of polymerization from about 4 to about 50 and/or a number average molecular weight from about 600 daltons to about 10000 daltons (e.g., from about 800 to about 8500 daltons). The low molecular weight polymer includes about 60 weight percent or more of one or more 1,1-disubstituted alkene compounds, based on the total weight of the low molecular weight polymer. Preferably the low molecular weight polymer includes a primary monomer present at about 90 weight percent or more, based on the total weight of the low molecular weight polymer, and the primary monomer is one of the one or more 1,1-disubstituted alkene compounds. The low molecular weight polymer preferably has a polydispersity index of about 5 or less.

The methods according to the teachings herein may be employed to produce a polymer including one or more 1,1-disubstituted alkene monomers having improved control of molecular weight, improved control of molecular weight distribution, or both. For example, a solution polymerization method (such as one according to the teachings herein) may be employed for controllably producing low molecular weight polymers including a 1,1-disubstituted alkene monomer. The methods according to the teachings herein may be employed to controllably produce high molecular weight polymers including a 1,1-disubstituted alkene compound. The methods according to the teachings herein may be employed to produce a random copolymer including two or more 1,1-disubstituted alkene monomers having improved control of the monomer sequence distribution. The methods according to the teachings herein may be employed to produce a block copolymer including two different polymer blocks, the block copolymer including one or more 1,1-disubstituted alkene monomers. The methods according to the teachings herein may be employed to produce a solution having generally high polymer concentration (e.g., about 2 weight percent or more, or about 5 weight percent or more) and/or having low viscosity. The methods according to the teachings herein may be employed to produce polymers using anionic polymerization with a throughput rate of about 10 kg/hour or more and/or in a reactor system having a volume (e.g., of the solution) of about 20 liter or more. For example, the methods according to the teachings herein may better control the temperature during the polymerization, even when using pilot scale or manufacturing scale production (e.g., so that the process is generally free of temperature spikes during polymerization).

BRIEF DESCRIPTION OF THE DRAWINGS

FIG. 3A is taken at an early stage of the polymerization reaction and the peak at 6.45 ppm identifies the presence of unreacted monomer. FIG. 3B is taken at a later stage of the polymerization reaction and there is no detectable peak at 6.45 ppm.

FIG. 4A is a DSC curve of a homopolymer of 2-phenyl-1-propanol ethyl methylene malonate. FIG. 4B is a DSC curve of a homopolymer of fenchyl methyl methylene malonate. FIG. 4C is a DSC curve of a random copolymer of 2-phenyl-1-propanol ethyl methylene malonate (about 50 weight percent) and fenchyl methyl methylene malonate (about 50 weight percent).

FIGS. 5A, 5B, 5C, and 5D are representative GPC chromatograms of polymers according to the teachings herein. The GPC chromatograms may be employed for the characterization of the molecular weight distribution.

DETAILED DESCRIPTION

Surprisingly, it has been found that a monomer including a 1,1-disubstituted alkene may be anionically polymerized using a solution polymerization process_to controllably produce polymers (e.g., to produce polymers having controlled molecular weight and/or structure). In the solution polymerization process, the monomers are diluted by a solvent and the monomer and solvent form a single continuous phase. During the polymerization process the resulting polymer may be soluble in the solvent, or may precipitate from the solvent. Preferably, the polymer is soluble in the solvent during some or all of the polymerization process. For example, the solvent and/or the reaction conditions (such as the solvent concentration, the polymerization temperature) may be selected so that the polymer is soluble in the solvent during some or all of the polymerization process. The methods according to the teachings herein may be used to prepare a homopolymer or a copolymer. For example, the polymer may be a random copolymer or a block copolymer.

Figure 1:
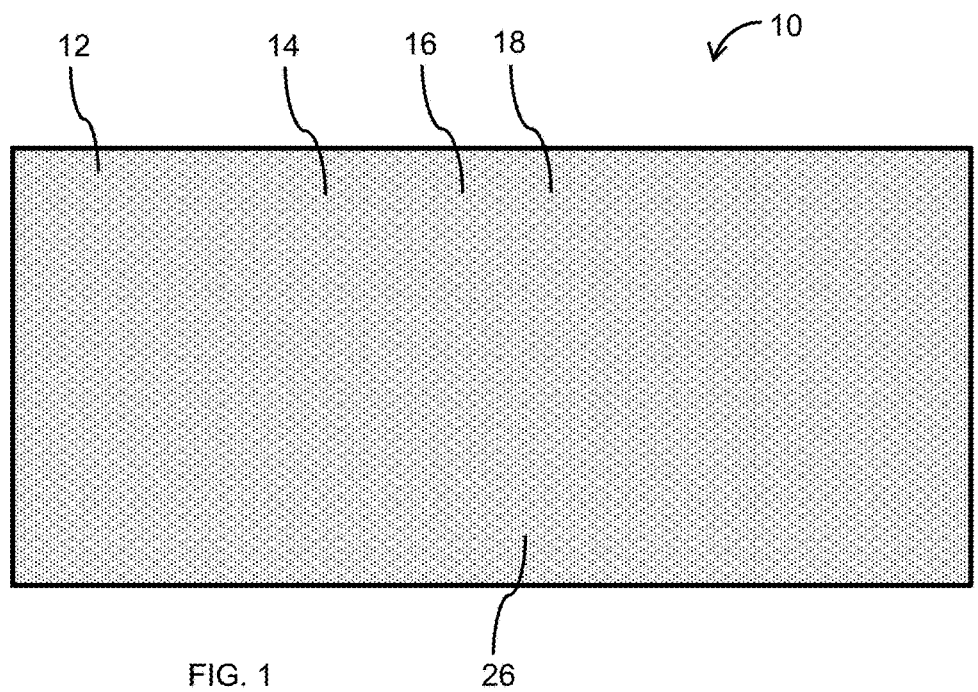
FIG. 1 is a drawing illustrating features of a system for solution polymerization of a polymer including a 1,1-disubstituted alkene monomer according to the teachings herein using anionic polymerization.

FIG. 1 illustrates features that may be employed in a solution polymerization system according to the teachings herein. The solution polymerization system 10 includes a continuous liquid phase 18 and optionally a dispersed polymer precipitate phase 20 (not shown). It will be appreciated that prior to a polymerization reaction, the liquid phase may include solvent 12, monomer 14 and be substantially free of any polymer 26. The polymerization may start (i.e., initiate) with the addition of activator 16. It will be appreciated that the activator 16 may be rapidly consumed during the initiation reaction. After a polymerization reaction begins, the polymer 26 may initially be in the liquid phase 18. As the polymer molecules grow, some or all of the polymer 26 may optionally precipitate out of the liquid phase 18 into a dispersed phase 20 (not shown). If a dispersed polymer phase 20 is formed, the dispersed phase may include the polymer 26 and optionally a portion of the monomer 14 and/or a portion of the solvent 12. The monomer 14 may be completely converted so that eventually the polymerization system 10 includes polymer 26 and is substantially or entirely free of monomer 14. The continuous liquid phase 18 may include or consist substantially (e.g., about 90 volume percent or more or about 98 volume percent or more based on the total volume of the continuous liquid phase) of the solvent 12, the monomer 14, and the polymer 26. The monomer 14 and/or polymer 26 preferably includes one or more 1,1-disubstituted alkene compounds (e.g., one or more 1,1-disubstituted ethylene compounds).

The monomer typically includes one or more 1,1-disubstituted alkene compounds (e.g., one or more 1,1-disubstituted ethylene compounds). The 1,1-disubstituted alkene preferably is a primary monomer (i.e., a monomer present at 50 weight percent or more of a polymer block or of an entire polymer). 1,1-disubstituted alkene compounds are compounds (e.g., monomers) wherein a central carbon atom is doubly bonded to another carbon atom to form an ethylene group. The central carbon atom is further bonded to two carbonyl groups. Each carbonyl group is bonded to a hydrocarbyl group through a direct bond or an oxygen atom. Where the hydrocarbyl group is bonded to the carbonyl group through a direct bond, a keto group is formed. Where the hydrocarbyl group is bonded to the carbonyl group through an oxygen atom, an ester group is formed. The 1,1-disubstituted alkene preferably has a structure as shown below in Formula I, where $X^1$ and $X^2$ are an oxygen atom or a direct bond, and where $R^1$ and $R^2$ are each hydrocarbyl groups that may be the same or different. Both $X^1$ and $X^2$ may be oxygen atoms, such as illustrated in Formula IIA, one of $X^1$ and $X^2$ may be an oxygen atom and the other may be a direct bond, such as shown in Formula IIB, or both $X^1$ and $X^2$ may be direct bonds, such as illustrated in Formula IIC. The 1,1-disubstituted alkene compounds used herein may have all ester groups (such as illustrated in Formula IIA), all keto groups (such as illustrated in Formula IIB) or a mixture thereof (such as illustrated in Formula IIC). Compounds with all ester groups are preferred due to the flexibility of synthesizing a variety of such compounds.

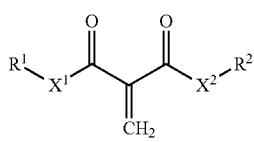

Formula I

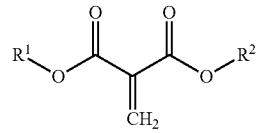

Formula IIA

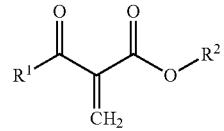

Formula IIB

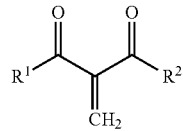

Formula IIC

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw materials, incomplete conversion of the reactants and formation of by-products. Durability in this context means that the composition once cured remains sufficiently strong to perform its designed function, in the embodiment wherein the cured composition is an adhesive, the adhesive holds substrates together for the life or most of the life of the structure containing the cured composition. As an indicator of this durability, the curable composition (e.g., adhesive) preferably exhibits excellent results during accelerated aging. Residual content of a component refers to the amount of the component present in free form or reacted with another material, such as a polymer. Typically, the residual content of a component can be calculated from the ingredients utilized to prepare the component or composition. Alternatively, it can be determined utilizing known analytical techniques. Heteroatom means nitrogen, oxygen, sulfur and phosphorus, more preferred heteroatoms include nitrogen and oxygen. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. One or both hydrocarbyl groups may consist of one or more carbon atoms and one or more hydrogen atoms. As used herein percent by weight or parts by weight refer to, or are based on, the weight of the solution composition unless otherwise specified.

Unless defined otherwise, all technical and scientific terms used herein have the meaning commonly understood by a person skilled in the art to which this disclosure belongs. The following references provide one of skill with a general definition of many of the terms used in this disclosure: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

1,1-disubstituted alkene compound means a compound having a carbon with a double bond attached thereto and which is further bonded to two carbon atoms of carbonyl groups. A preferred class of 1,1-disubstituted alkene compounds are the methylene malonates which refer to compounds having the core formula

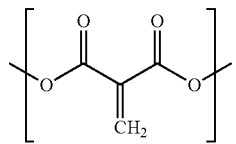

The term "monofunctional" refers to 1,1-disubstituted alkene compounds or a methylene malonates having only one core formula. The term "difunctional" refers to 1,1-disubstituted alkene compounds or a methylene malonates having two core formulas bound through a hydrocarbyl linkage between one oxygen atom on each of two core formulas. The term "multifunctional" refers to 1,1-disubstituted alkene compounds or methylene malonates having more than one core formula which forms a chain through a hydrocarbyl linkage between one oxygen atom on each of two adjacent core formulas. The term "latent acid-forming impurities" or "latent acid-forming impurity" refers to any impurity that, if present along with the 1,1-disubstituted alkene compounds or methylene malonates, will with time be converted to an acid. The acid formed from these impurities may result in overstabilization of the 1,1-disubstituted alkene compounds, thereby reducing the overall quality and reactivity of the compounds. The term "ketal" refers to a molecule having a ketal functionality; i.e., a molecule containing a carbon bonded to two —OR groups, where O is oxygen and R represents any alkyl group. The terms "volatile" and "non-volatile" refers to a compound which is capable of evaporating readily at normal temperatures and pressures, in the case of volatile; or which is not capable of evaporating readily at normal temperatures and pressures, in the case of non-volatile. As used herein, the term "stabilized" (e.g., in the context of "stabilized" 1,1-disubstituted alkene compounds or monomer compositions comprising same) refers to the tendency of the compounds (or the monomer compositions), prior to activation with an activator, to substantially not polymerize with time, to substantially not harden, form a gel, thicken, or otherwise increase in viscosity with time, and/or to substantially show minimal loss in cure speed (i.e., cure speed is maintained) with time. As used herein, the term "shelf-life" (e.g., as in the context of 1,1-disubstituted alkene compounds having an improved "shelf-life") refers to the 1,1-disubstituted alkene compounds which are stabilized for a given period of time; e.g., 1 month, 6 months, or even 1 year or more.

The hydrocarbyl groups (e.g., $R^1$ and $R^2$), each comprise straight or branched chain alkyl, straight or branched chain alkyl alkenyl, straight or branched chain alkynyl, cycloalkyl, alkyl substituted cycloalkyl, aryl, aralkyl, or alkaryl. The hydrocarbyl group may optionally include one or more heteroatoms in the backbone of the hydrocarbyl group. The hydrocarbyl group may be substituted with a substituent that does not negatively impact the ultimate function of the monomer or the polymer prepared from the monomer. Preferred substituents include alkyl, halo, alkoxy, alkylthio, hydroxyl, nitro, cyano, azido, carboxy, acyloxy, and sulfonyl groups. More preferred substituents include alkyl, halo, alkoxy, alkylthio, and hydroxyl groups. Most preferred substituents include halo, alkyl, and alkoxy groups.

As used herein, alkaryl means an alkyl group with an aryl group bonded thereto. As used herein, aralkyl means an aryl group with an alkyl group bonded thereto and include alkylene bridged aryl groups such as diphenyl methyl groups or diphenyl propyl groups. As used herein, an aryl group may include one or more aromatic rings. Cycloalkyl groups include groups containing one or more rings, optionally including bridged rings. As used herein, alkyl substituted cycloalkyl means a cycloalkyl group having one or more alkyl groups bonded to the cycloalkyl ring.

Preferred hydrocarbyl groups include 1 to 30 carbon atoms, more preferably 1 to 20 carbon atoms, and most preferably 1 to 12 carbon atoms. Preferred hydrocarbyl groups with heteroatoms in the backbone are alkyl ethers having one or more alkyl ether groups or one or more alkylene oxy groups. Preferred alkyl ether groups are ethoxy, propoxy, and butoxy. Preferably such compounds contain from about 1 to about 100 alkylene oxy groups and more preferably about 1 to about 40 alkylene oxy groups and more preferably from about 1 to about 12 alkylene oxy groups, and most preferably from about 1 to about 6 alkylene oxy groups.

One or more of the hydrocarbyl groups (e.g., $R^1$, $R^2$, or both), preferably includes a $C_{1-15}$ straight or branched chain alkyl, a $C_{1-15}$ straight or branched chain alkenyl, a $C_{5-18}$ cycloalkyl, a $C_{6-24}$ alkyl substituted cycloalkyl, a $C_{4-18}$ aryl, a $C_{4-20}$ aralkyl, or a $C_{4-20}$ aralkyl. More preferably, the hydrocarbyl group, includes a $C_{1-8}$ straight or branched chain alkyl, a $C_{5-12}$ cycloalkyl, a $C_{6-12}$ alkyl substituted cycloalkyl, a $C_{4-18}$ aryl, a $C_{4-20}$ aralkyl, or a $C_{4-20}$ aralkyl.

Preferred alkyl groups include methyl, propyl, isopropyl, butyl, tertiary butyl, hexyl, ethyl pentyl, and hexyl groups. More preferred alkyl groups include methyl and ethyl. Preferred cycloalkyl groups include cyclohexyl and fenchyl. Preferred alkyl substituted groups include menthyl and isobornyl.

Most preferred hydrocarbyl groups attached to the carbonyl group include methyl, ethyl, propyl, isopropyl, butyl, tertiary, pentyl, hexyl, octyl, fenchyl, menthyl, and isobornyl.

Particularly preferred monomers include methyl propyl methylene malonate, dihexyl methylene malonate, di-isopropyl methylene malonate, butyl methyl methylene malonate, ethoxyethyl ethyl methylene malonate, methoxyethyl methyl methylene malonate, hexyl methyl methylene malonate, dipentyl methylene malonate, ethyl pentyl methylene malonate, methyl pentyl methylene malonate, ethyl ethylmethoxy methylene malonate, ethoxyethyl methyl methylene malonate, butyl ethyl methylene malonate, dibutyl methylene malonate, diethyl methylene malonate (DEMM), diethoxy ethyl methylene malonate, dimethyl methylene malonate, di-N-propyl methylene malonate, ethyl hexyl methylene malonate, methyl fenchyl methylene malonate, ethyl fenchyl methylene malonate, 2 phenylpropyl ethyl methylene malonate, 3 phenylpropyl ethyl methylene malonate, and dimethoxy ethyl methylene malonate.

Some or all of the 1,1-disubstituted alkenes can also be multifunctional having more than one core unit and thus more than one alkene group. Exemplary multifunctional 1,1-disubstituted alkenes are illustrated by the formula:

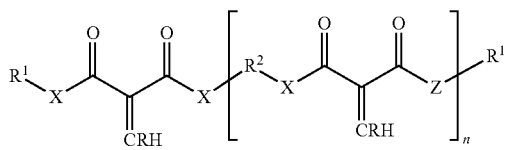

wherein $R^1$, $R^2$ and X are as previously defined; n is an integer of 1 or greater; and R is a hydrocarbyl group, and the 1,1-disubstituted alkene has n+1 alkenes. Preferably n is 1 to about 7, and more preferably 1 to about 3, and even more preferably 1. In exemplary embodiments $R^2$ is, separately in each occurrence, straight or branched chain alkyl, straight or branched chain alkenyl, straight or branched chain alkynyl, cycloalkyl, alkyl substituted cycloalkyl, aryl, aralkyl, or alkaryl, wherein the hydrocarbyl groups may contain one or more heteroatoms in the backbone of the hydrocarbyl group and may be substituted with a substituent that does not negatively impact the ultimate function of the compounds or polymers prepared from the compounds. Exemplary substituents are those disclosed as useful with respect to $R^1$. In certain embodiments $R^2$ is, separately in each occurrence, $C_{1-15}$ straight or branched chain alkyl, $C_{2-15}$ straight or branched chain alkenyl, $C_{5-18}$ cycloalkyl, $C_{6-24}$ alkyl substituted cycloalkyl, $C_{4-18}$ aryl, $C_{4-20}$ aralkyl or $C_{4-20}$ aralkyl groups. In certain embodiments $R^2$ is separately in each occurrence $C_{1-8}$ straight or branched chain alkyl, $C_{5-12}$ cycloalkyl, $C_{6-12}$ alkyl substituted cycloalkyl, $C_{4-18}$ aryl, $C_{4-20}$ aralkyl or $C_{4-20}$ alkaryl groups.

It will be appreciated according to the teaching herein, the one or more monomer may include a comonomer that is a 1,1-disubstituted alkene compound having a hydrocarbyl group bonded to each of the carbonyl groups through a direct bond (e.g., a carbon-carbon bond) or an oxygen atom, such as a monomer having one or more features described above. If included, a comonomer may optionally be a monomer that is not a 1,1-disubstituted alkene compound. Any comonomer capable of anionic polymerization may be employed. For example, the comonomer may be capable of forming a random copolymer with a 1,1-disubstituted alkene compound, capable of forming a block copolymer with a 1,1-disubstituted alkene compound, or both.

The 1,1-disubstituted alkene compound preferably is prepared using a method which results in a sufficiently high purity so that it can be polymerized. The purity of the 1,1-disubstituted alkene compound may be sufficiently high so that 70 mole percent or more, preferably 80 mole percent or more, more preferably 90 mole percent or more, even more preferably 95 mole percent or more, and most preferably 99 mole percent or more of the 1,1-disubstituted alkene compound is converted to polymer during a polymerization process. The purity of the 1,1-disubstituted alkene compound preferably is about 85 mole percent or more, more preferably about 90 mole percent or more, even more preferably about 93 mole percent or more, even more preferably about 95 mole percent or more, even more preferably about 97 mole percent or more, and most preferably about 99 mole percent or more, based on the total weight of the 1,1-disubstituted alkene compound. If the 1,1-disubstitute alkene compound includes impurities, preferably about 40 mole percent or more, more preferably about 50 mole percent or more of the impurity molecules are the analogous 1,1-disubstituted alkane compound. The concentration of any impurities having a dioxane group preferably is about 2 mole percent or less, more preferably about 1 mole percent or less, even more preferably about 0.2 mole percent or less, and most preferably about 0.05 mole percent or less, based on the total weight of the 1,1-disubstituted alkene compound. The total concentration of any impurity having the alkene group replaced by an analogous hydroxyalkyl group (e.g., by a Michael addition of the alkene with water), preferably is about 3 mole percent or less, more preferably about 1 mole percent or less, even more preferably about 0.1 mole percent or less, and most preferably about 0.01 mole percent or less, based on the total moles in the 1,1-disubstituted alkene compound. Preferred 1,1-disubstituted alkene compounds are prepared by a process including one or more (e.g., two or more) steps of distilling a reaction product or an intermediate reaction product (e.g., a reaction product or intermediate reaction product of a source of formaldehyde and a malonic acid ester).

The 1,1-disubstituted alkene compound may include a monomer produced according to the teachings of U.S. Pat. No. 8,609,885 (Malofsky et al.) incorporated herein by reference in its entirety. Other examples of monomers which may be employed include the monomers taught in International Patent Application Publication Nos. WO2013/066629 and WO 2013/059473, both incorporated herein by reference.

The concentration of the monomer in the solution polymerization process may be sufficiently low so that after polymerization, the solution can flow. If the concentration of the monomer is too high, the solution becomes too viscous at the end of the polymerization process and the solution may be difficult to handle. The concentration of the monomer in the solution polymerization process may be sufficiently high so that the polymerization process is economical. The one or more monomers is preferably present at a concentration of about 0.5 weight percent or more, more preferably about 2 weight percent or more, even more preferably about 5 weight percent or more, and most preferably about 8 weight percent or more, based on the total weight of the solvent and monomer. The one or more monomers may be present at a concentration of about 90 weight percent or less, preferably about 75 weight percent or less, more preferably about 50 weight percent or less, even more preferably about 30 weight percent or less, and most preferably about 20 weight percent or less. If the monomer is added at multiple times (such as continuous and/or sequential monomer addition), it will be appreciated that the amount of the one or more monomers refers to the total amount of monomer and polymer and by-products of the monomer that are present when the addition of monomer has been completed.

Solvent

The polymerization process includes one or more solvents selected so that the monomer and solvent form a single phase. Preferably the solvent does not chemically react with the other components of the solution polymerization system during the polymerization process. For example, the solvent preferably does not react with the monomer. As another example, the solvent preferably does not react with the activator. As such, the amount of the solvent present at the end of the polymerization reaction may be substantially the same as the amount of solvent present at the start of the polymerization reaction. For example the change in the amount of solvent may be about 20% or less, preferably about 10% or less, more preferably about 5% or less, even more preferably about 1% or less, and most preferably about 0.2% or less, based on the initial weight of the solvent at the start of the polymerization process.

Preferred solvents are organic solvents, or mixtures of organic solvents. Such solvents, or solvent mixtures typically are in a liquid state at the reaction temperature(s) (e.g., during activation and/or during polymerization.

The pressure of the solvent (e.g., organic solvent) and of the monomer at the polymerization temperature should be sufficiently low so that the risk of the reactor failing from over-pressure is reduced or eliminated. For example the partial pressure of the solvent, of the monomer, or both, at the polymerization temperature may be about 500 Torr or less, about 200 Torr or less, about 50 Torr or less, or about 5 Torr or less.

The solvent may include one or more protic solvents, one or more aprotic solvents, or both. Preferably the solvent includes, consists essentially of, or consists entirely of one or more aprotic solvent. An aprotic solvent may include one or more polar aprotic solvent and/or one or more nonpolar aprotic solvents. Preferred aprotic solvents include, consist essentially of, or consist entirely of one or more polar aprotic solvents. Most preferably, the solvent is substantially free of (e.g., having a concentration of less than about 10 weight percent, less than about 5 weight percent, or less than 1 weight percent of the solvent) protic solvents and/or nonpolar aprotic solvents. Examples of solvents which may be employed include alkanes, aryl containing compounds, alcohols, acetates, hydrofurans, ketones, halocarbon containing compounds, and mixtures thereof. More preferred solvents include acetates, hydrofurans, ketones, halocarbon containing compounds, and mixtures thereof. Preferred solvents are compounds having a molecular weight of about 200 g/mole or less, more preferably about 120 g/mole or less, and most preferably about 80 g/mole or less. Particularly preferred solvents include tetrahydrofuran, n-propyl acetate, benzene, and xylene.

It may be desirable for the solvent to be substantially or entirely free of any solvent that may react with the monomer via Michael addition. However, by selecting reaction conditions so that the polymerization reaction is sufficiently fast, it may be possible to employ such monomers in the solvent polymerization process. For example, by selecting parameters such as monomer feed rates, reaction temperature, monomer type, and pH, it may be possible to employ a solvent including or consisting of a protic solvent, such as an alcohol.

The solvent may be selected to be generally compatible or miscible with one or more of the monomers (e.g., with the primary monomer), with the polymer (e.g., with one or more blocks of a block copolymer), or both. For example, the solvent and the monomer may be characterized by Hildebrand solubility parameters that differ by about 5 $(MPa)^{1/2}$ or less, more preferably that differ by about 2 $(MPa)^{1/2}$ or less, even more preferably that differ by about 1 $(MPa)^{1/2}$ or less, even more preferably that differ by about 0.7 $(MPa)^{1/2}$ or less, and most preferably that differ by about 0.4 $(MPa)^{1/2}$ or less. The solvent and monomer may have about the same Hildebrand solubility parameter. In some aspects, it may be desirable for the polymer to remain in solution until after polymerization is complete. In other aspects, it may be desirable for the polymer to precipitate out (e.g., by forming a phase that is rich in the polymer, that consists essentially of the polymer, or that consists entirely of the polymer) during the polymerization process.

If the concentration of solvent is too low, the solution becomes too viscous at the end of the polymerization process and the solution may be difficult to handle. The solvent may be present at a concentration of about 10 weight percent or more, preferably about 25 weight percent or more, more preferably about 35 weight percent or more, even more preferably about 45 weight percent or more, even most preferably about 50 weight percent or more, based on the total weight of the solvent and monomer. In cases where increased control is critical, the concentration of the solvent may be about 60 weight percent or more, or about 85 weight percent or more, based on the total weight of the solvent and monomer. The solvent is preferably present at a concentration of about 99.5 weight percent or less, more preferably about 98 weight percent or less, even more preferably about 95 weight percent or less, and most preferably about 92 weight percent or less, based on the total weight of the solvent and monomer.

It may be desirable for the polymer to be isolated from some or all of the solvent. As such, it may be advantageous to select a solvent that forms a single phase with the monomer, but after polymerizing the monomer to a desired molecular weight (e.g., number average molecular weight) the polymer will precipitate out of solution. Alternatively, after the completion of polymerization, a compound that is a poor solvent to the polymer may be added to the solution to cause the polymer to precipitate out, such as described herein.

The solution polymerization may be initiated using an activator capable of initiating anionic polymerization of the 1,1-disubstituted alkene containing compound. The activator may be a compound that is a nucleophile or a compound that forms a nucleophile. Examples of activators (i.e., initiators), which may be employed, include ionic metal amides, hydroxides, cyanides, phosphines, alkoxides, amines and organometallic compounds (such as alkyllithium compounds), and metal benzoates. The polymerization activator may have one or more of the features (e.g., include one or any combinations of the activating agents and/or polymerization activators, include an activating agent at a concentration or concentration range, or include a process step) as described in US patent Application publication US 2015/0073110 A1, published on Mar. 12, 2015, incorporated herein by reference (e.g., see paragraphs 0024 to 0050). By way of example, the activator may include, consist essentially of, or consist entirely of one or more metal benzoates, such as sodium benzoate. The molecular weight of the polymer may be adjusted by adjusting the molar ratio of the monomer to the activator. Preferably the molar ratio of the monomer to activator is about 5 or more, about 50 or more, about 100 or more, about 500 or more, or about 1,000 or more. The molar ratio of the monomer to the activator preferably is about 100,000 or less, about 50,000 or less, about 10,000 or less, or about 2,000 or less. A particularly preferred activator for the anionic polymerization process according to the teachings herein is sec-butyl lithium. Sec-butyl lithium may be employed in activating the polymerization of a homopolymer or of a copolymer (e.g., a random copolymer, or a block copolymer).

According to certain embodiments, a suitable polymerization activator can generally be selected from any agent that can initiate polymerization substantially upon contact with a selected polymerizable composition. In certain embodiments, it can be advantageous to select polymerization initiators that can induce polymerization under ambient conditions and without requiring external energy from heat or radiation. In embodiments wherein the polymerizable composition comprises one or more 1,1-disubstituted alkene compounds, a wide variety of polymerization initiators can be suitable including most nucleophilic initiators capable of initiating anionic polymerization. For example, suitable initiators include alkali metal salts, alkaline earth metal salts, ammonium salts, amine salts, halides (halogen containing salts), metal oxides, and mixtures containing such salts or oxides. Exemplary anions for such salts include anions based on halogens, acetates, benzoates, sulfur, carbonates, silicates and the like. The mixtures containing such salts can be naturally occurring or synthetic. Specific examples of suitable polymerization initiators for 1,1-disubstituted alkene compounds can include ionic compounds such as sodium benzoate, sodium pyruvate, and tetramethyl guanidine. Additional suitable polymerization initiators for such polymerizable compositions are also disclosed in U.S. Patent Application Publication No. 2015/0073110, which is hereby incorporated by reference.

The solvent and/or one or more of the monomers (e.g., the 1,1-disubstituted alkene compounds) may further contain other components to stabilize the monomer prior to exposure to polymerization conditions or to adjust the properties of the final polymer for the desired use. Prior to the polymerization reaction, one or more inhibitors may be added to reduce or prevent reaction of the monomer. Such inhibitors may be effective in preventing anionic polymerization of the monomer, free radical polymerization of the monomer, reaction between the monomer and other molecules (such as water), or any combination thereof.

An acid containing compound may be employed in the solution polymerization process. With various monomers, the use of an acid containing compound may be employed to reduce the reaction rate, decrease the polydispersity, or both. When the concentration of the acid containing compound is too high, the polymerization reaction may be too slow for commercial viability. When the concentration of the acid containing compound is too low, the polymerization reaction may result in a polymer having rapid and/or uncontrolled buildup of molecular weight. The acid containing compound may be an organic compound having one or more acid groups. For example, the acid containing compound may include one or more acid groups having a sulfur, phosphorous, chlorine, or bromine, fluorine or nitrogen atom. The acid containing compound preferably includes one or more nitrogen atoms (such as in a nitrate or nitrite group) and/or one or more sulfur atoms (such as an alkyl or aryl sulfonic acid. Particularly preferred acid containing compounds include methanesulfonic acid and benzoic acid. It will be appreciated that the acid containing compounds may affect the initiation, propagation, or termination of the polymer. The weight ratio of the acid containing compound to the amount of the monomer employed for a polymerization step (e.g., for polymerizing a first polymer block) preferably is about 0.00005 or more, more preferably about 0.0002 or more and most preferably about 0.0005 or more. The weight ratio of the acid containing compound to the amount of the monomer employed for a polymerization step (e.g., for polymerizing a first polymer block) preferably is about 0.2 or less, more preferably about 0.04 or less, and most preferably about 0.005 or less.

The polymerization process may include a step of applying shear forces to a mixture including at least the monomer and the solvent. For example, the process may include stirring or otherwise agitating the mixture for creating the solution, for dispersing or removing a precipitated polymer, for controlling thermal gradients, or any combination thereof.

The polymerization process may be a batch process (e.g., using a single batch reactor or a series of batch reactors). The polymerization process may be in a continuous process, such as a process that transports a solution along the length of a reactor. In a batch process, or in a continuous process, all of the monomer may be added at a single stage (e.g., prior to the addition of the polymerization activator, or at or near the start of the polymerization reaction) or may be added at multiple stages in the polymerization reaction.

The polymerization process may be employed for polymerization of a homopolymer or a copolymer, such as a random copolymer or a block copolymer. The homopolymer or copolymer includes one or more 1,1-disubstituted alkene containing compounds according to the teachings herein. Preferably, the amount of the 1,1-disubstituted alkene containing compounds in the polymer is about 5 weight percent or more, more preferably about 30 weight percent or more, even more preferably about 50 weight percent or more, even more preferably about 70 weight percent or more, based on the total weight of the polymer. For example, one or more of the polymer blocks may consist essentially of, or entirely of the 1,1-disubstituted alkene containing compounds.

A multi-stage addition of monomer may be employed for polymerization of a block copolymer having polymer blocks with different compositions. For example, a block copolymer may have a first polymer block, (block A), and a second polymer block (block B). The block copolymer may have 2 or more blocks or 3 or more blocks. The A block and B block may include at least one monomer that is the same (however at different concentrations), or may include only monomers that are different. For example, the A block may be a homopolymer of a first monomer, and the B block may include one or more second monomers which are each different from the first monomer. The first polymer block may be a homopolymer or a copolymer (e.g., a random copolymer). The second polymer block may be a homopolymer or a copolymer (e.g., a random copolymer). The first polymer block and the second polymer block preferably each include one or more 1,1-disubstituted alkene containing compounds according to the teachings herein. Preferably, the amount of the 1,1-disubstituted alkene containing compounds in the first polymer block and/or in the second polymer block may be about 30 weight percent or more, preferably about 50 weight percent or more, even more preferably about 70 weight percent or more, based on the total weight of the polymer block. For example, one or more of the polymer blocks may consist essentially of, or entirely of the 1,1-disubstituted alkene containing compounds. It will be appreciated that one or more blocks may be substantially or entirely free of any 1,1-disubstituted alkene containing compounds. For example, one or more of the polymer blocks may include one or more conjugated diene monomers and/or one or more styrenic monomers.

During the polymerization process, the solution is preferably stirred or otherwise agitated to create the solution. For example, the solution including the monomer, the solvent, and any polymer may be mixed at a rate of about 10 rpm or more, about 50 rpm or more, about 200 rpm or more, or about 1,000 rpm or more.

The solution polymerization process preferably includes a reaction temperature at which the partial pressure of the solvent is generally low. For example, the partial pressure of the solvent and/or the monomer may be about 400 Torr or less, about 200 Torr or less, about 100 Torr or less, about 55 Torr or less, or about 10 Torr or less. The reaction temperature preferably is about 80° C. or less, more preferably about 70° C. or less, even more preferably about 60° C. or less, even more preferably about 55° C. or less, even more preferably about 45° C. or less, even more preferably about 40° C. or less, and most preferably about 30° C. or less. The reaction temperature typically is sufficiently high that the solvent and the monomer are in a liquid state. For example, the reaction temperature may be about −100° C. or more, about −80° C. or more, about −30° C. or more, or about 10° C. or more.

When polymerizing a 1,1-disubstituted alkene compound, it may be desirable to add one or more acid compounds to the solution, to the monomer, or both, so that the initial pH of the solution is about 7 or less, about 6.8 or less, about 6.6 or less, or about 6.4 or less. It is believed that such an initial acidic condition may be beneficial for controlling or otherwise limiting the initiation of the monomer. For example, the 1,1-disubstituted alkene compound may be a compound that will auto-initiate under basic conditions and the use of an acid condition may prevent or minimize such auto-initiation. The acidic condition preferably is maintained throughout the polymerization process. If the pH is too low, the reaction rate may be low or the reaction may be terminated. Preferably, the pH during the reaction is about 5 or more, more preferably about 5.5 or more, even more preferably about 5.9 or more, and most preferably about 6 or more. It will be appreciated that following the polymerization process the pH may be adjusted to increase or decrease the pH.

The solution polymerization process may be stopped prior to the completion of the polymerization reaction or may be continued until the completion of the polymerization reaction. Preferably, the reaction rate is sufficiently high and/or the reaction time is sufficiently long so that the polymerization reaction is substantially complete. For example the conversion of the monomer to polymer may be about 30 weight percent or more, about 60 weight percent or more, about 90 weight percent or more, about 95 weight percent or more, or about 99 weight percent or more. The conversion of monomer to polymer may be about 100 weight percent or less.

Figure 2:
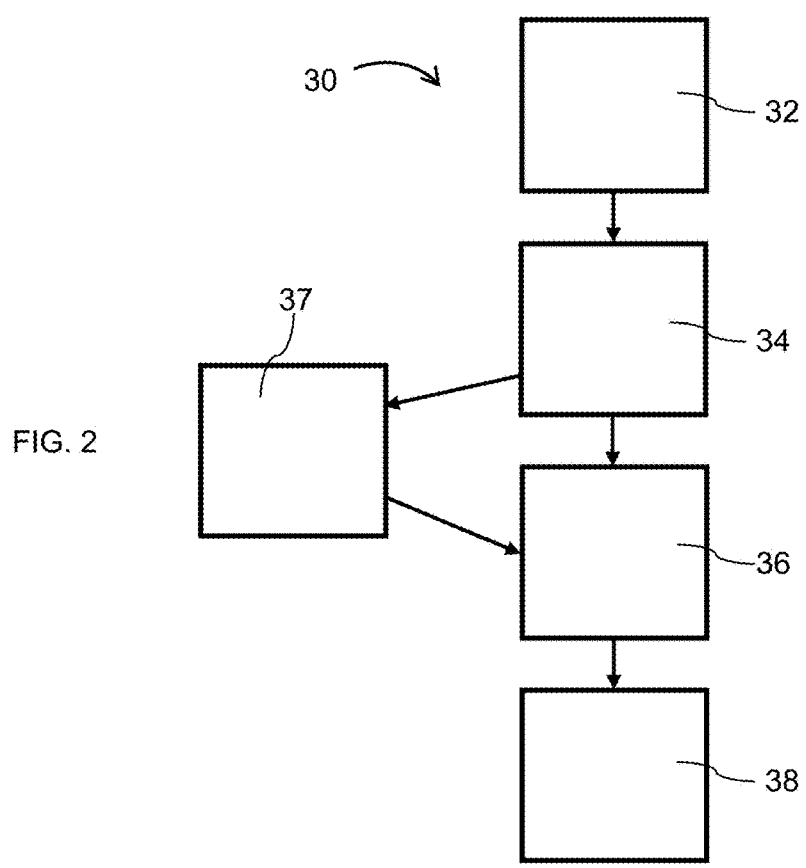
FIG. 2 is a diagram illustrating features of a process for polymerization of a polymer including a 1,1-disubstituted alkene monomer using anionic polymerization.

With reference to FIG. 2, the solution polymerization process 30 typically includes a step of developing a generally homogenous solution. For example, the process may include a step of combining a solvent, one or more monomers, and an activator. It will be appreciated that the components of the solution may be added at one time, may be added at different times, or some components may be combined separately. The development of the homogeneous solution 32 typically requires agitation. Depending on the type and intensity of the agitation, it may be possible to control the rate at which the homogenous solution is developed. The process typically includes a step of initiating the polymerization reaction 34. The initiation step preferably occurs after the monomer and solvent have been homogenized. It will be appreciated that an activator may be added into the system prior to the addition of monomer, at the same time as the addition of the monomer, or after addition of a first portion of the monomer and prior to the addition of a second portion of the monomer. After activation of the monomer, the process includes a step of propagating the polymer by an anionic polymerization reaction 36. The propagating step may continue until all of the monomer is consumed, or until the propagation reaction is stopped, such as by quenching 38 or the conditions are altered so that further anionic polymerization reaction stops. The propagation step may also stop by a phase separation of the polymer from the monomer (e.g., where the monomer has difficulty in contacting the reactive end of the polymer molecule). Prior to a step of quenching, there may be one or more additional steps of feed monomer (which may be the same or different from the initial monomer feed), and one or more additional steps of propagating the polymerization reaction. With each such propagating step, the polymer molecular weight generally increases, unless conditions for addition chain activation are provided (for example by adding additional activator). It will be appreciated that the resulting polymer may be capable of further reaction with monomer and may thus be a "living" polymer.

Figure 3A:
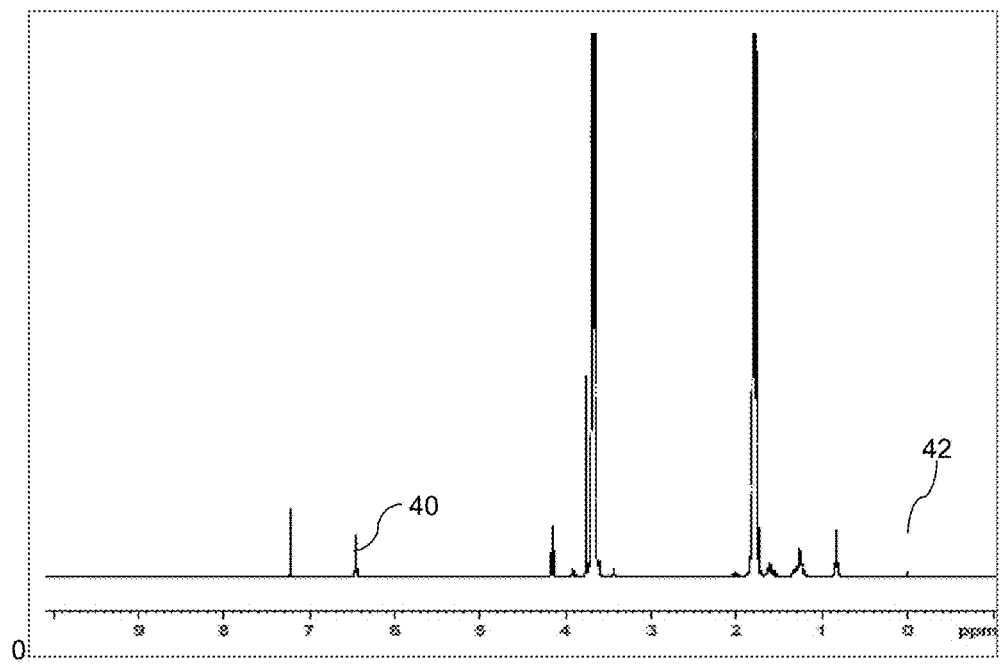
FIGS. 3A and 3B depict representative NMR spectrograms illustrating the conversion of monomer to polymer via solution polymerization.
Figure 3B:
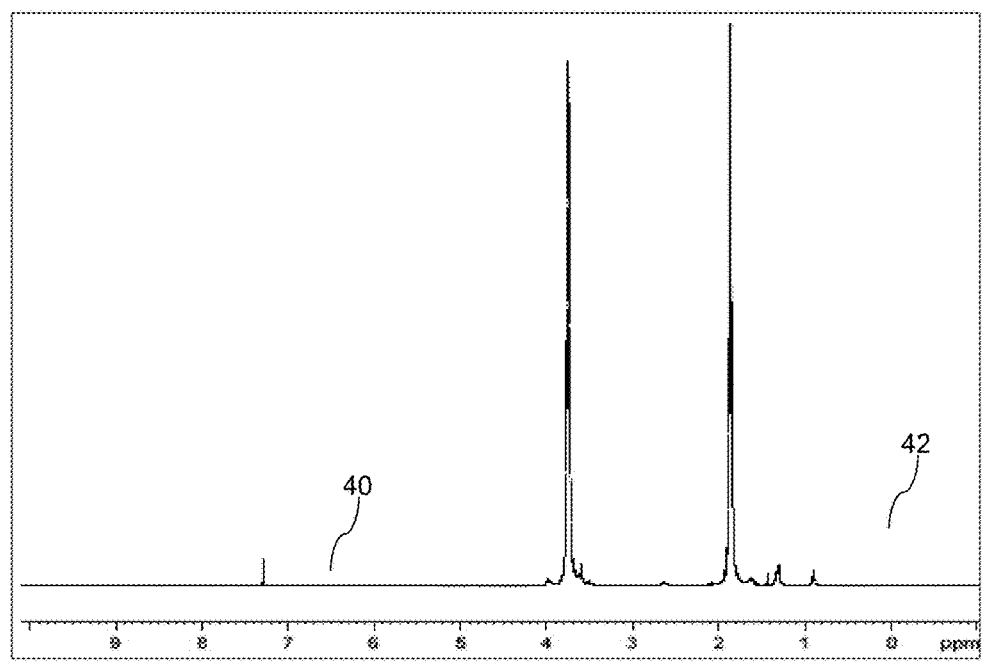

The conversion of monomer to polymer may be measured using NMR spectroscopy, such as illustrated in FIG. 3A and FIG. 3B, corresponding to an early and a later stage of a propagation reaction for polymerizing a 1,1-disubstituted alkene monomer. Here, the monomer is diethyl methylene malonate and the concentration of the monomer can be monitored by the peak at about 6.45 ppm 40 corresponding to the reactive double bond of the monomer. Hexamethyldisiloxane is used here an internal standard (i.e., internal reference) 42 and is seen at about 0 ppm. It will be appreciated that other compounds may be employed as an internal standard. In FIG. 3A, the NMR spectrogram was measured on a first aliquot taken from a specimen initiated with sodium benzoate at a molar ratio of monomer to initiator of about 100:1. The first aliquot was taken after the reaction had propagated for about 30 seconds at room temperature. The first aliquot was quenched with an acid to stop the propagation reaction. FIG. 3B shows the NMR spectrogram from a second aliquot taken from the same specimen after about 5 minutes of the propagation reaction. As seen in FIG. 3B, the monomer is no longer detectable as evidenced by a lack of the reactive double bond peak at about 6.45 ppm 40.

The polymers according to the teachings herein preferably have a number average molecular weight or a weight average molecular weight that is about 700 g/mole or more, more preferably about 2,000 g/mole or more, even more preferably about 10,000 g/mole or more, and most preferably about 20,000 g/mole or more. The molecular weight of the polymer may be sufficiently low so that the polymer may be easily processed. The number average molecular weight or the weight average molecular weight preferably is about 3,000,000 g/mole or less, more preferably about 2,000,000 g/mole or less, even more preferably about 1,000,000 g/mole or less, and most preferably about 600,000 g/mole or less.

The resulting polymer may be a relatively low molecular weight polymer having a number average molecular weight of about 40,000 g/mole or less, about 30,000 g/mole or less, or about 20,000 g/mole or less. The resulting polymer may be a relatively high molecular weight polymer having a number average molecular weight of greater than 40,000 g/mole, about 60,000 g/mole or more, or about 100,000 g/mole or more.

The resulting polymer may be characterized by a polydispersity index of about 1.00 or more or about 1.05 or more. The resulting polymer may be characterized by a polydispersity index of about 20 or less, preferably about 7 or less, more preferably about 4 or less, and most preferably about 2.3 or less. The resulting polymer may have a narrow molecular weight distribution such that the polydispersity index is about 1.9 or less, about 1.7 or less, about 1.5 or less, or about 1.3 or less.

The degree of polymerization, as used herein, is generally the molecular (as defined herein) divided by the average molecular weight of the monomer units. For example, the weight average degree of polymerization of a homopolymer is the weight average molecular weight of the homopolymer (e.g., in units based on the PMMA standards) divided by the molecular weight of the monomer unit.

Surprisingly, by employing an acid containing compound according to the teachings herein, it may be possible to reduce the polydispersity of a polymer (e.g., of a polymer block) without a substantive reduction in the polymerization reaction rate. For example, the polydispersity of the ratio of the polymer prepared with the acid containing compound to the polydispersity of a polymer prepared using the same method except without the use of the acid containing compound may be about 0.9 or less, about 0.8 or less, about 0.7 or less, or about 0.6 or less. The ratio of the time for converting 80% of the monomer to polymer for the process including the acid containing compound to the time for converting 80% of the monomer to polymer in the identical process (except without the acid containing compound) preferably is about 5 or less, more preferably about 3 or less, even more preferably about 2 or less, and most preferably about 1.5 or less.

Figure 5C:
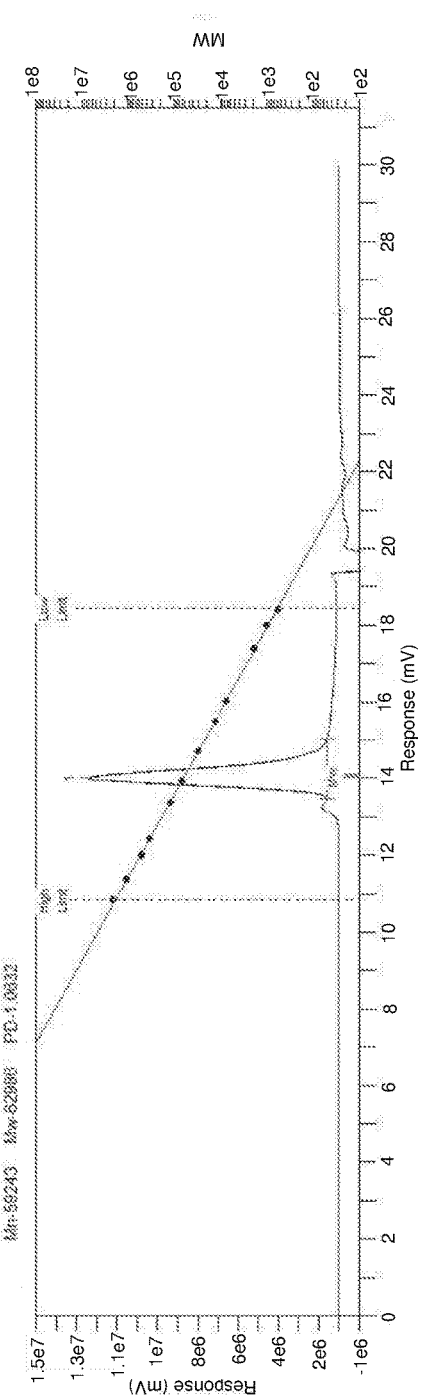
Figure 5D:
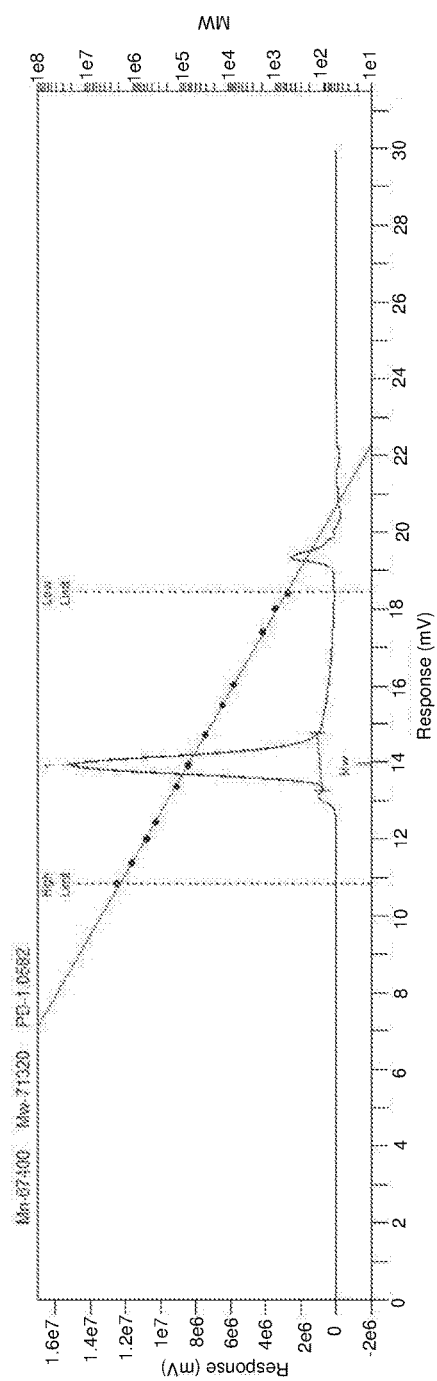

The molecular weight of the polymer may be measured using gel permeation chromatography (i.e., GPC), FIG. 5A, illustrates a GPC curve for a homopolymer prepared by polymerizing diethyl methylene malonate in an solution system. TMG is used as the activator for the anionic polymerization of the monomer. The molar ratio of monomer to the activator is about 1000:1. The reaction was continued until about 100 percent of the monomer was converted to polymer. The GPC curve 58 of the resulting homopolymer is shown in FIG. 5A. This sample has a single peak which defines an area 50 for calculating the molecular weight characteristics of the polymer (e.g., weight average molecular weight, peak molecular weight, number average molecular weight, z-average molecular weight, and polydispersity index). The GPC curve 58 shows the signal intensity (which correlates with concentration) as a function of the retention time in minutes. The calibration curve 54 is also shown in FIG. 5A. The calibration curve shows the retention time for a series of PMMA standards of known molecular weight. The low limit 56 for measuring the molecular weight based on these standards is about 200 daltons. The sequential increase in the molecular weight of a block copolymer after the addition of each of four polymer blocks is shown in FIGS. 5A, 5B, 5C, and 5D.

The solution polymer according to the teachings herein may be characterized as an elastomer. For example, the resulting polymer may be substantially free of a melting temperature and substantially free of a glass transition temperature of about 15° C. or more.

The solution polymer according to the teaching herein may be characterized as a thermoplastic having a melting temperature and/or a glass transition temperature of about 15° C. or more, about 50° C. or more, about 80° C. or more, about 100° C. or more, or about 120° C. or more. Polymers having a high glass transition temperature include those having hydrocarbonyl groups that provide steric hindrance that reduce the mobility of polymer molecules in the melt state. The melting temperature and/or the glass transition temperature of the thermoplastic may be about 300° C. or less, about 250° C. or less, or about 150° C. or less.

The solution polymer according to the teachings herein may be characterized as a block copolymer including at least one block having a glass transition temperature or melting temperature of about 15° C. or more (e.g., about 50° C. or more, about 80° C. or more, or about 100° C. or more) and at least one different block having no melting temperature above 15° C. and having a glass transition temperature of less than 15° C. (e.g., about 10° C. or less, about 0° C. or less, or about −20° C. or less). In one aspect, a block copolymer may be prepared with blocks that are not miscible so that the resulting block copolymer has multiple phases at room temperature. As such, the block copolymer may have a first glass transition temperature corresponding to the first polymer block and a second glass transition temperature corresponding to the second polymer block. It will be appreciated that the glass transition temperature of the blocks may be tailored based on the monomer or monomers used in the particular block and/or based on end effects (which includes the effect of the number of monomer units in the block). For purposes of illustration, a polymer block consisting essentially of, or consisting entirely of: (1) diethyl methylene malonate homopolymer is expected to have a glass transition temperature of about 25° C. to about 45° C. (preferably about 30° C.), (2) fenchyl methyl methylene malonate is expected to have a glass transition temperature of about 125° C. to about 200° C. (preferably about 150° C.), (3) methyl methoxyethyl methylene malonate is expected to have a glass transition temperature of about −15° C. to about +10° C. (preferably about 0° C.), (4) hexyl methyl methylene malonate is expected to have a glass transition temperature of about −45° C. to about 0° C. (preferably about −34° C.), (5) dibutyl methylene malonate is expected to have a glass transition temperature of about −55° C. to about −35° C. (preferably about −44° C.). It may be possible to prepare a block copolymer having multiple glass transition temperatures, such as a first glass transition temperature characteristic of a first polymer block and a second glass transition temperature characteristic of a second polymer block. In some block copolymers, a single glass transition is observed indicating that a single phase is formed, indicating that the two polymer blocks have substantially the same glass transition temperature (e.g., a difference of about 20° C. or less, about 10° C. or less, or both).

Figure 4A:
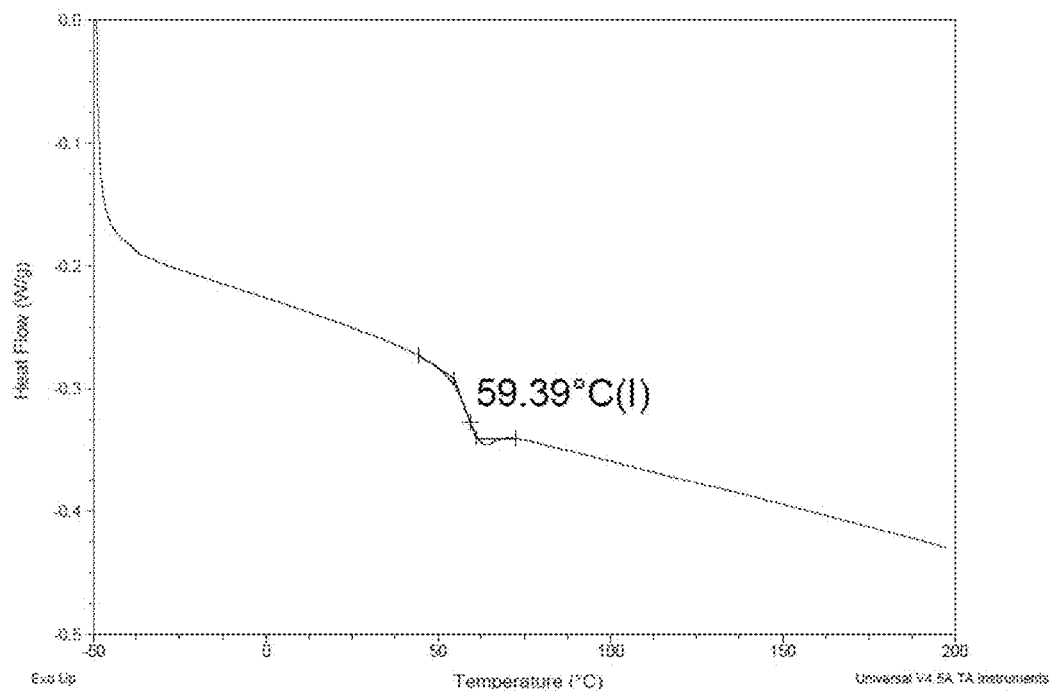
FIGS. 4A, 4B, and 4C are differential scanning calorimetry (DSC) curves of polymers prepared by anionic polymerization in solution according to the teachings herein, measured at a heating rate of about 10° C./min using a sample size of about 7 mg showing the glass transition temperature of the polymer.
Figure 4B:
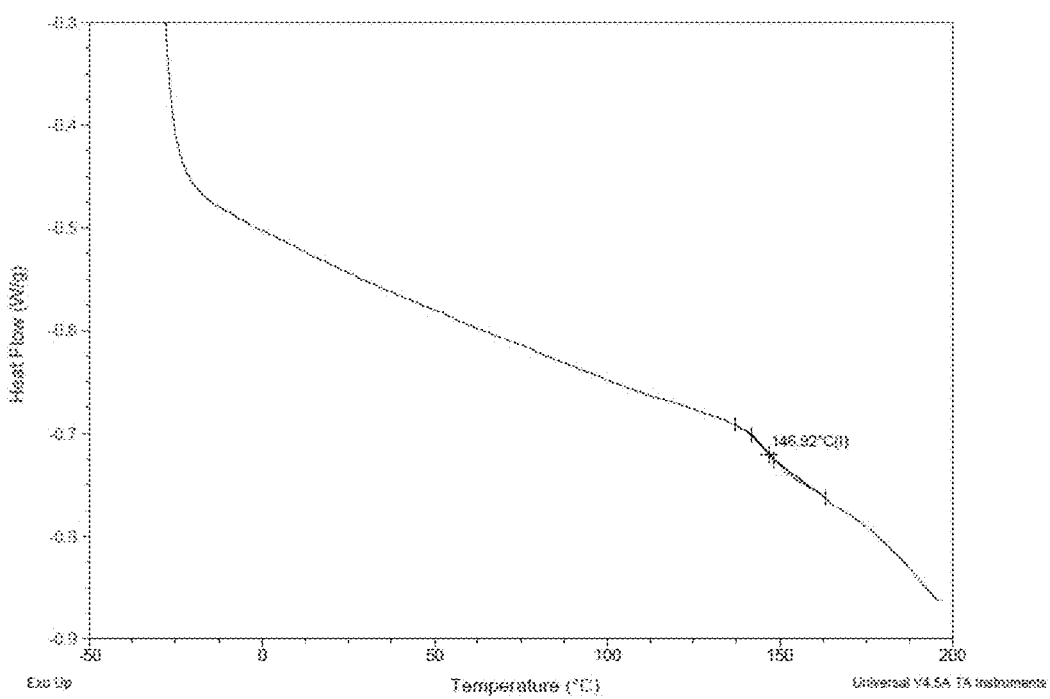
Figure 4C:
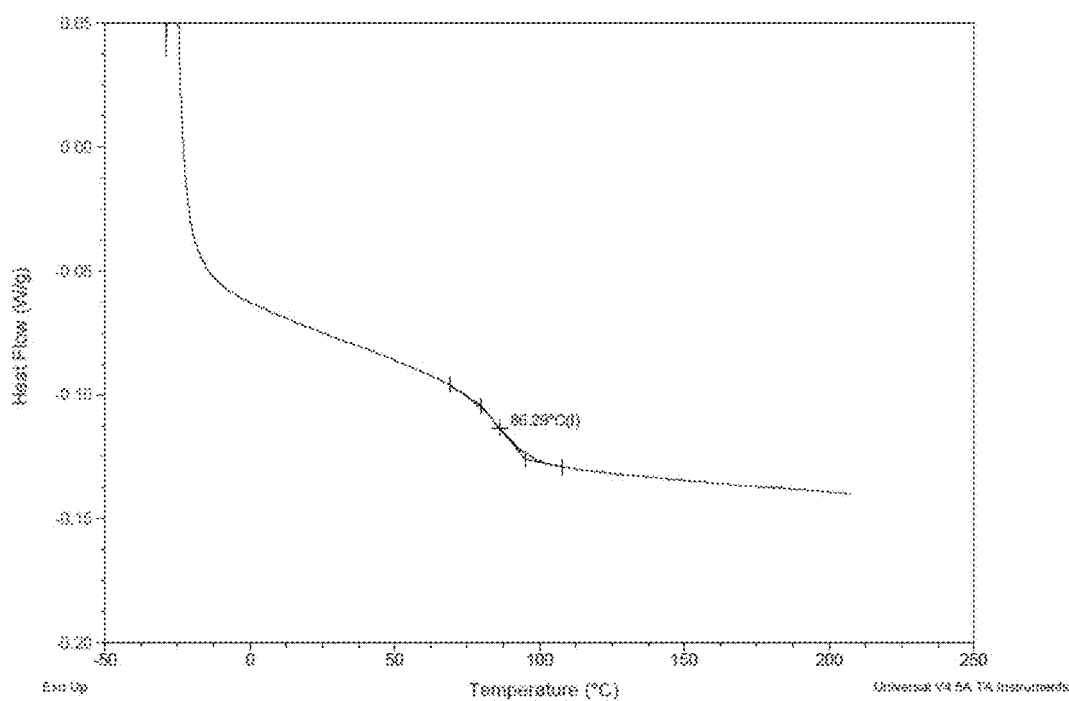

The solution polymer according to the teachings herein may be a characterized as a random copolymer and/or having a polymer block that is a random copolymer. The random copolymer may include a primary monomer (e.g., present at a concentration of about 50 mole percent or more) and a secondary monomer randomly distributed through the polymer chain and having a concentration of less than 50 mole percent. The properties of the random copolymer will generally differ from the properties of a homopolymer consisting entirely of the primary monomer. For example, as the amount of the secondary monomer is increased from about 0.5 mole percent to about 49.5 mole percent, the glass transition temperature of the random copolymer may shift from a glass transition temperature characteristic of the primary monomer towards a glass transition temperature characteristic of the secondary monomer. When prepared as a random copolymer, the polymer typically has a single glass transition temperature (e.g., even when a mixture of a homopolymer of the primary monomer and a homopolymer of the secondary monomer, at the same concentration, exhibits multiple glass transition temperatures). A homopolymer may have a single glass transition temperature, such as illustrated in FIG. 4A for a homopolymer of 2-phenyl-1-propanol ethyl methylene malonate (Tg of about 59.4° C.) and FIG. 4B for a homopolymer of fenchyl methyl methylene malonate (Tg of about 146.9° C.). A random copolymer (of monomer A and monomer B) may have one or more glass transition temperatures between the glass transitions of the corresponding homopolymer (homopolymer A and homopolymer B), such as illustrated in FIG. 4C, a random copolymer of 2-phenyl-1-propanol ethyl methylene malonate (about 50 weight percent) and fenchyl methyl methylene malonate (about 50 weight percent) having a glass transition temperature of about 86.3° C. Preferably, the glass transition temperature of the random copolymer of monomer A and monomer B, may differ from the glass transition temperature of both homopolymer A and homopolymer B (e.g., all having a weight average molecular weight of about 10,000 or more, or about 40,000 or more) by about 10° C. or more, by about 20° C. or more, or by about 25° C. or more.

The homopolymer of the primary monomer may be a semicrystalline polymer. Typically, when a secondary monomer is added in preparing a random copolymer, the secondary monomer will partially inhibit the ability of the primary monomer to crystallize, resulting in a random copolymer having different properties from the homopolymer such as a lower crystallinity, a lower flexural modulus, a lower melting temperature, or any combination thereof. For example, the selection of the secondary monomer and/or the amount of the secondary monomer in the random copolymer may be selected so that the random copolymer has a melting temperature that is reduced (i.e., relative to the homopolymer of the primary monomer) by about 5° C. or more, by about 10° C. or more, by about 15° C. or more, or by about 20° C. or more. The selection of the secondary monomer and/or the amount of the secondary monomer in the random copolymer may be selected so that the random copolymer has a crystallinity that is reduced (i.e., relative to the homopolymer of the primary monomer) by about 10% or more, by about 20% or more, by 40% or more, or by about 60% or more.

The resulting polymer may be a block copolymer including at least a first polymer block and a second polymer block different from the first polymer block. The first polymer block and the second polymer block may differ with respect to one or any combination of the following properties: peak melting temperature, final melting temperature, crystallinity, glass transition temperature, flexural modulus, tensile modulus, elongation at failure, gas barrier properties, or adhesion properties. For example, the first polymer block and the second polymer block may have melting temperatures (peak melting temperatures and/or final melting temperatures) differing by about 10° C. or more, about 20° C. or more, about 30° C. or more, or about 50° C. or more. It will be appreciated that one polymer block may have a melting temperature and the other polymer block may be free of crystalline polymer so that there is no measurable melting temperature. The first polymer block and the second polymer block may have glass transition temperatures differing by about 10° C. or more, about 20° C. or more, about 30° C. or more, or about 40° C. or more. The first polymer block and the second polymer block may have crystallinities that differ by about 10% or more, about 15% or more, about 20% or more, about 25% or more, or about 30% or more. The first polymer block and the second polymer block may have moduli (e.g., flex modulus, tensile modulus, or both) having a ratio of about 1.5 or more, about 2 or more, about 4 or more, about 8 or more, or about 15 or more. The first polymer block and the second polymer block may have a ratio of elongation at failure and/or a ratio of tensile strength of about 2 or more, about 3 or more, about 4 or more, or about 6 or more.

The degree of blockiness (i.e., the blockiness index, or BI) in a random copolymer may be calculated by the ratio of the concentration of diad fractions of a first monomer (e.g., a primary monomer that is a 1,1-disubstituted alkene compound) added to the second monomer f(M1−M2) plus the diad fractions of the second monomer added to the first monomer f(M2−M1) to the theoretical concentration of diad fractions for a statistical random copolymer $2 X_{M1}(1-X_{M1})$, where $X_{M1}$ is the molar fraction of first monomer:

$$BI=(f(M1-M2)+f(M2-M1))/(2X_{M1}(1-X_{M2}))$$

By definition a true statistically random copolymer has a BI of one (1.0). Blocky random copolymers will have a lower concentration of M1−M2 and M2−M1 diad fractions, and BI will be less than 1.0. Block copolymers will have very low concentrations of M1−M2 and M2−M1 diad fractions and BI will be much less than 1 and approach zero. On the other end, alternating copolymers having $X_{M1} \geq 0.5$ will have $BI=1+(1/X_{M1})$. The concentration of the diad fractions and $X_{M1}$ may be measured using $^{13}C$ NMR spectroscopy, using analogous peak assignments and techniques described by Yi-Jun Huange et al. in "Random Copolymers of Propylene Oxide and Ethylene Oxide Prepared by Double Metal Cyanide Complex Catalyst", Chinese Journal of Polymer Science, 20:5, 2002, pages 453-459, incorporated herein by reference in its entirety.

Preferred random copolymers have a BI of about 0.70 or more, more preferably about 0.75 or more, even more preferably about 0.80 or more, even more preferably about 0.85 or more, even more preferably about 0.90 or more, and most preferably about 0.95 or more. Preferred random copolymers have a BI preferably less than about $1+(0.8/x_{M1})$, more preferably less than about $1+(0.5/x_{M1})$, even more preferably less than about $1+(0.25/x_{M1})$, and most preferably less than about $1+(0.10/x_{M1})$ where $x_{M1}$ is the molar fraction of primary monomer in the copolymer and $x_{M1}$ is at least 0.5.

The resulting polymer may be employed in a polymeric composition including one or more additives, such as antioxidants, heat stabilizers, light stabilizers, process stabilizers, lubricants, antiblocking agents, antistatic agent, antifogging agents, solvents, plasticizers, fillers, antistatic agents, coupling agents (e.g., for the fillers), crosslinking agents, nucleating agent, anti-blocking agent, defoaming agents, pigments, colorant, flame retardant additives, flow aid, lubricant, slip agent and other processing aids known to the polymer compounding art. Suitable flame retardants may include halogen containing flame retardants and halogen free flame retardants.

Polymeric compositions may comprise one or more other fillers, such as a filler particle (e.g., fibers, powders, beads, flakes, granules, and the like). The filler particle may be a fiber (e.g., having an aspect ratio of the longest direction to each perpendicular direction that is greater than 10). The filler particle may be a particle that is not a fiber (e.g., having an aspect ratio of the longest direction to a perpendicular direction that is less than 10, less than 8, or less than 5). The filler may be formed of an organic material and/or an inorganic material. Examples of organic fillers include fillers derived from biomass and fillers derived from polymers. Inorganic fillers include, nonmetallic materials, metallic materials, and semiconductor material. For example, the filler particle may include alumina silicate, aluminum hydroxide, alumina, silicon oxide, barium sulfate, bentonite, boron nitride, calcium carbonate (e.g., activated calcium carbonate, light calcium carbonate, or heavy calcium carbonate), calcium hydroxide, calcium silicate, calcium sulfate, carbon black, clay, cotton flock, cork powder, diatomaceous earth, dolomite, ebonite powder, glass, graphite, hydrotalcite, iron oxide, iron metallic particles, kaolin, mica, magnesium carbonate, magnesium hydroxide, magnesium oxide, phosphide, pumice, pyrophyllite, sericite, silica, silicon carbide, talc, titanium oxide, wollastonite, zeolite, zirconium oxide, or any combination thereof. The filler particles may be present at a concentration of about 0.1 weight percent or more, about 1 weight percent or more, about 5 weight percent or more, or about 10 weigh percent or more. The filler particles may be present at a concentration of about 70 weight percent or less, about 50 weight percent or less, about 35 weight percent or less, or about 25 weigh percent or less. The filler particles preferably have one, two, or three dimensions that are about 1 mm or less, about 0.3 mm or less, about 0.1 mm, about 50 µm or less, about 10 µm or less. The filler particles preferably have one, two, or three dimensions that are about 0.1 µm or more, about 0.3 µm or more, or about 1 µm or more.

The polymeric compositions according to the teachings herein may include a plasticizer for adjusting the properties of the final polymer for the desired use. The plasticizer may be added prior to, during, or after polymerization. For example, in certain embodiments, a suitable plasticizer can be included with the 1,1-disubstituted alkene monomer. Generally, suitable plasticizers can include plasticizers used to modify the rheological properties of adhesive systems including, for example, straight and branched chain alkylphthalates such as diisononyl phthalate, dioctyl phthalate, and dibutyl phthalate, as well as partially hydrogenated terpene, trioctyl phosphate, epoxy plasticizers, toluene-sulfamide, chloroparaffins, adipic acid esters, sebacates such as dimethyl sebacate, castor oil, xylene, 1-methyl-2-pyrrolidione and toluene. Commercial plasticizers such as HB-40 manufactured by Solutia Inc. (St. Louis, Mo.) can also be suitable.

The process may include one or more steps of monitoring or otherwise measuring the conversion rate of the monomer to polymer. The concentration of the remaining monomer may be determined for example using NMR spectroscopy. For example, quantitative NMR spectroscopy may be employed to measure the concentration of alkylene groups (e.g., 1-ethylene groups) remaining in the solution.

The solution polymer of the current teaching may be mixed with one or more additional polymers for preparing a polymeric composition. The concentration of the solution polymer in the polymeric composition may be about 1 weight percent or more, about 5 weight percent or more, about 10 weight percent or more, about 20 weight percent or more, or about 50 weight percent or more, based on the total weight of the polymers in the polymeric composition. The solution polymer may be present in the polymeric composition at a concentration of about 100 weight percent or less, about 95 weight percent or less, or about 90 weight percent or less, or about 60 weight percent or less, based on the total weight of the polymers in the polymeric composition.

The process may include one or more steps of removing some or all of the solvent from the polymer. The process of removing the solvent may use heat, reduced pressure or both for separating the polymer from the solvent. The process of removing the solvent may include a step of filtering and/or a step of adding one or more additional liquids to the solution. For example, a non-solvent may be added at a sufficient quantity to precipitate polymer out of solution. As another example, a solvent may be added to increase the solubility of the solvent mixture and retain the polymer in the solvent solution. Other liquids may be employed for washing a precipitate, such as after a step of filtering. The process may include one or more steps of recovering unreacted monomer following polymerization. The process may include one or more steps of purifying a solvent (e.g., following polymerization and/or for use in polymerization).

The process may include one or more steps of terminating (i.e., quenching) the anionic polymerization reaction. For example, polymerization can be quenched by contacting the solution with an anionic polymerization terminator. In some embodiments the anionic polymerization terminator is an acid. In some embodiments it is desirable to utilize a sufficient amount of the acid to render the polymerization mixture (e.g., the solution and/or the solvent) slightly acidic, preferably having a pH of less than 7, more preferably less than 6. Exemplary anionic polymerization terminators include, for example, mineral acids such as methanesulfonic acid, sulfuric acid, and phosphoric acid and carboxylic acids such as acetic acid and trifluoroacetic acid.

The polymers and polymer compositions according to the teachings herein (e.g., after removing some or all of the solvent) may have one or more rheological properties (e.g., melt index, melt flow rate, viscosity, melt strength, and the like) suitable for processing the polymer with known polymer processing equipment. For example, the polymer or polymer composition including 1,1-disubstituted alkene compounds may be processed using extrusion, co-extrusion, injection molding, insert molding, co-injection molding, calendaring (e.g., using two or more rolls), blow molding, compression molding, thermoforming, rolling, spray coating. For example, the polymeric material (i.e., the polymer or the polymer composition) may be fed through a processing apparatus having a screw and a barrel assembly wherein the polymeric material is conveyed along the screw at a temperature at which the polymeric material is at least partially in a liquid state (e.g., above any glass transition temperature and above any melting temperature).

The polymers according to the teachings herein preferably adhere to one or more of the following substrates: aluminum, steel, glass, silicon, or wood. For example, when separating two substrates having the polymer placed between the substrates, the separation of the substrates may result in cohesive failure of the polymer, where some polymer remains on the surfaces of the substrates.

The polymers according to the teachings herein may be employed in extruded, blow molded, injection molded, thermoformed, or compression molded articles. The polymers may be employed as an adhesive. For example, the polymers may be employed in a pressure sensitive adhesive composition. The polymers may be employed as a coating, such as a protective coating. The polymer may be employed as a primer layer over a substrate.

Melting temperatures and glass transition temperatures are measured using differential scanning calorimetry on a sample of about 0.5-20.0 mg. The sample is heated at a rate of about 10° C./min and then cooled at a rate of about 20° C./min.

The molecular weight is determined using gel permeation chromatography. GPC samples are prepared by first quenching with trifluoroacetic acid and then drying the polymer to remove the solvent). The dried polymer is dissolved in tetrahydrofuran (THF). About 25 uL of the dissolved polymer solution is injected into the THF eluent having a flow rate of 1 mL/min. Two columns with 5 micron, highly crosslinked polystyrene/divinylbenzene matrix particles are employed. These columns are designed to measure molecular weights of linear polymers from 700 to 2,000,000. The column pressure is about 65 bar and the column temperature is about 35° C. The elution time is 30 minutes. The column is calibrated using PMMA standards. As such, the units for molecular weight are relative based on the standard PMMA equivalent molecular weights.

Monomer conversion is calculated using quantitative NMR. A 300 MHz NMR is employed. Any residual polymerization reaction of the polymerization specimen is quenched prior to NMR analysis by adding trifluoroacetic acid. The preferred solvent is $CDCl_3$ as it is a polar aprotic solvent. Hexamethyldisiloxane is added as an internal standard and is suitable for these monomer compositions. The double bond intensity at about 6.45 ppm is measured to determine the concentration of unconverted monomer. This double bond is a singlet for symmetrical monomers such as diethyl methylene malonate and dibutyl methylene malonate, and it is a doublet for asymmetrical monomers such as hexyl methyl methylene malonate. Four NMR scans are run on each specimen with a 20 second delay between scans.

EXAMPLES

The 1,1-disubstituted alkene compounds employed herein are high purity monomers, having a purity of 97 weight percent or more. The monomers either have only trace impurities and are thus stable from polymerization (anionic or free radical polymerization) or are provided with a sufficient stabilizer package (e.g., about 10 ppm methanesulfonic acid and 100 ppm mono methyl ether hydroquinone) to prevent polymerization prior to the solution polymerization initiated for example by an activator. Unless otherwise specified, the reaction time for the polymerization reaction is about 1 hour or less.

Solution Polymerization Examples

Example H-1

Fenchyl-methyl methylene malonate (F3M) is polymerized in solution. The solvent is tetrahydrofuran. A round bottom flask is charged with about 9.0 of tetrahydrofuran and about 1.0 g of the fenchyl-methyl methylene malonate. The mixture is stirred with a magnetic stirrer for about 5 minutes. Tetramethyl guanidine (TMG) is then added to the flask to activate the polymerization reaction. The molar ratio of monomer (F3M) to activator (TMG) is about 1000 (i.e., 1000:1). The polymerization reaction is continued for about 1 hour at a temperature of about 23° C. The polymerization process is monitored by taking small aliquots of solution and quenching the reaction in the aliquot by adding an acid. After the 1 hour polymerization, a molar excess of trifluoroacetic acid (TFA) is added to the flask to quench (i.e., stop) the polymerization reaction. An aliquot of the solution is taken and characterized by NMR spectroscopy. Another aliquot of the solution is analyzed by gel permeation chromatography to measure the molecular weight distribution. The solution is then precipitated in cold (0° C.) methanol. The polymer precipitates as a white powder. The precipitated polymer is filtered, dried and then characterized using Differential Scanning calorimetry (DSC). NMR spectroscopy at the end of the reaction shows no measurable presence of residual monomer. The GPC indicates that the polymer has a first peak in molecular weight at about 2000 and a second peak in molecular weight at about 60,000. The polymer has a polydispersity index of about 1.43. The glass transition temperature of the polymer is about 151° C. In the homopolymerization of fenchyl-methyl methylene malonate, by varying the reaction conditions, the purity of the monomer, the activator concentration and the reaction temperature, the molecular weight distribution of the polymer may be varied between about 1 to 8 and glass transition of the polymer may be increased to be as high as about 190° C. (e.g., when weight average molecular weight is high).

Example H-2

This example is prepared according to the method of Example H-1, except the monomer is p-menthyl methyl methylene malonate (4M). The resulting polymer has a glass transition temperature of about 126° C. The number average molecular weight is about 40,000. The homopolymerization of p-menthyl methyl methylene malonate may result in polymer having a glass transition temperature of up to about 145° C. (e.g., by employing process conditions that result in higher weight average molecular weight).

Example H-3 is a polymer of diethyl methylene malonate prepared in solution. About 18 g of tetrahydrofuran solvent is added to a HDPE bottle having a PTFE coated magnetic stir bar at a temperature of about 23° C. and ambient pressure. The bottle is placed on a magnetic stir plate using a mixing speed of about 800-1000 rpm. About 2 grams of diethyl methylene malonate monomer (DEMM) is added to the HDPE bottle and mixed to form a solution of the monomer in the solvent. After about 5 minutes, about 72 microliters of tetramethylene guanidine (TMG) (at 1 weight percent) in methylene chloride is added to the monomer solution in the HDPE bottle. This corresponds to a molar ratio of monomer (DEMM) to activator (TMG) of about 2000:1. After a 1 hour reaction time, the polymerization is terminated by adding about 0.2 ml of trifluoroacetic acid. The polymer is recovered from the solvent using the method described above for Example H-1. The molecular weight distribution of the resulting polymer is measured using gel permeation chromatography and the results are shown in Table 1.

Example H-4 is prepared according to the method of preparing Example H-3, except the amount of the activator is reduced to about 36 microliters, corresponding to a molar ratio of monomer to activator of about 4000:1. Example H-5 is prepared according to the method of preparing Example H-3, except the mount of the activator is reduced to about 18 microliters, corresponding to a molar ratio of monomer to activator of about 8000:1. Example H-6 is prepared according to the method of preparing Example H-3, except the mount of the activator is reduced to about 9 microliters, corresponding to a molar ratio of monomer to activator of about 16000:1. Example H-7 is prepared according to the method of preparing Example H-3, except the mount of the activator is reduced to about 4.5 microliters, corresponding to a molar ratio of monomer to activator of about 32000:1.

Activator Examples

Example A-1

A weak base may be employed to initiate the anionic polymerization of a 1,1-disubstituted alkene compound. In example A-1, an activator solution is prepared by dissolving 0.13 g of potassium benzoate and 0.428 g of a crown ether (18-crown 6) in 10 mL of dichloromethane. The molar ratio of potassium benzoate to the crown ether is about 1:2. It is believed that crown ethers may assist in solubilizing the potassium benzoate in DCM. The activator solution is used for activating the solution polymerization of diethyl methylene malonate (about 2 g) in tetrahydrofuran (about 18 g). About 138 microliters of the activator solution is added to initiate the polymerization. The molar ratio of monomer to activator is about 1000:1. Polymerization is allowed to continue for 24 hours at about 23° C., and then quenched with trifluoroacetic acid. The resulting polymer is further diluted with tetrahydrofuran for measuring the molecular weight distribution by gel permeation chromatography. The polymer has a weight average molecular weight of about 405,700 and a number average molecular weight of about 198,000.

TABLE 1

Effects of activator concentration on molecular weight distribution

|  | Example H-3 | Example H-4 | Example H-5 | Example H-6 | Example H-7 |
| --- | --- | --- | --- | --- | --- |
| DEMM, g | 2.0 | 2.0 | 2.0 | 2.0 | 2.0 |
| THF, g | 18.0 | 18.0 | 18.0 | 18.0 | 18.0 |
| 1% TMG in methylene chloride, μl | 75 | 35.5 | 18 | 9 | 4.5 |
| DEMM:TMG | 2000:1 | 4000:1 | 8000:1 | 16000:1 | 32000:1 |
| Mn (daltons) | 49,000 | 55,000 | 96,000 | 339,000 | 1,080,000 |
| Mw (daltons) | 259,000 | 252,000 | 334,000 | 642,000 | 2,068,000 |
| PDI = Mw/Mn | 5.4 | 4.6 | 3.5 | 1.9 | 1.9 |

Example N-1

Example N-1 is prepared by polymerizing diethyl methylene malonate at low temperature. The polymerization is performed at about −78° C. in a Schlenk flask apparatus. All glassware is thoroughly dried by repeatedly pulling vacuum and purging with nitrogen. Freshly distilled diethyl methylene malonate monomer is stored in a sealed polypropylene bottle and degassed under vacuum prior to use. The solvent, tetrahydrofuran, is taken directly from a sealed bottle without exposing to air or moisture. The activator is secondary butyl lithium and is provided as a 1.5 M solution in cyclohexane. The reaction temperature is maintained using a dry ice/acetone freezing mixture. About 1 g of the diethyl methylene malonate is dissolved in about 9 g of tetrahydrofuran in a round bottom flask under a nitrogen environment. After about 5 minutes, the activator solution was added (about 5 microliters), resulting in a molar ratio of monomer to activator of about 1000:1. The reaction was continued for about 20 minutes and then terminated by adding methanol and trifluoroacetic acid. Aliquots are removed at about 2 minutes, 6 minutes, 10 minutes, and 20 minutes polymerization time. The molecular weight distribution of each aliquot is measured using gel permeation chromatography. The results are given in Table 2.

TABLE 2

|  | Example N-1 2 minutes | Example N-1 6 minutes | Example N-1 10 minutes | Example N-1 20 minutes |
| --- | --- | --- | --- | --- |
| Mn, daltons | 12,750 | 20,980 | 36,940 | 41,280 |
| Polydispersity Index | 2.2 | 1.8 | 1.2 | 1.2 |

Example N-2

The anionic polymerization of 1,1-disubstituted alkenes may be characterized as a living polymerization. In example N-2, the process of Example N-1 is repeated except the amount of diethyl methylene malonate initially added to the tetrahydrofuran solvent is about 0.25 g. During the polymerization reaction, a small aliquot is removed every 2 minutes and an additional 0.25 g of the monomer is added to the reaction flask. The process is continued for about 10 minutes, when the polymer begins to precipitate out of the solvent. The amount of activator employed is selected so that the molar ratio of the amount of monomer added in the first injection (i.e., 0.25 g) to the activator is about 1000:1. The molecular weight, measured by gel permeation chromatography increases nearly linearly:

| Time (min) | 0 | 4 | 6 | 8 | 10 |
| --- | --- | --- | --- | --- | --- |
| Mn (daltons) | 0 | 48,000 | 75,000 | 100,000 | 130,000 |

Example N-3

Example N-3 is prepared the same as Example N-2 except the amount of the activator is increased so that the molar ratio of total monomer to activator is about 100:1. Again, the polymer continues to grow with each additional charge of monomer:

| Time (min) | 2 | 4 | 6 | 8 | 10 |
| --- | --- | --- | --- | --- | --- |
| Mn (daltons) | 8,000 | 22,000 | 41,000 | 58,000 | 81,000 |

Copolymers/Random Copolymers

Example R-1

Example R-1 is a random copolymer prepared using solution polymerization. The method used for Example H-3 is used with the following changes: (1) the 2 g of DEMM was replaced with 1 g of (P3M) and 1 g of (H3M); and (2) the amount of the 1 percent TMG activator solution is adjusted so that the molar ratio of the total monomer to the activator is about 1000:1. The polymerization reaction is at about 23° C. The polymer is characterized using gel permeation chromatography and differential scanning calorimetry. The resulting polymer is a random copolymer having a single glass transition temperature of about 27.5° C. The number average molecular weight is about 7,104 daltons, and the weight average molecular weight is about 16,343 daltons, resulting in a polydispersity index, PDI, of about 2.3.

Example R-2, R-3, and R-4 are random copolymers including a first monomer that is a 1,1-disubstituted alkene monomer and a second monomer that is a second 1,1-disubstituted alkene monomer. Example R-2, R-3, and R-4 are prepared using the method of Example R-1, except (1) the amount of tetrahydrofuran is about 9 g, and (2) the monomers are replaced with hexyl methyl methylene malonate (HM3) and diethyl methylene malonate (DEMM) with a ratio of HM3 to DEMM of 75:25, 50:50, and 25:75, respectively, and a total of 1 g of monomer. The polymerization is continued for about 1 hour at about 23° C., while mixing. After quenching with trifluoroacetic acid, the resulting polymer is characterized by gel permeation chromatography, and NMR spectroscopy. After isolating the polymer by precipitation, filtration and drying the polymer is characterized by differential scanning calorimetry.

Example H-8, is an homopolymer prepared according to the method of Example R-2, except the monomer is 1 g of hexyl methyl methylene malonate monomer. The results for examples R-2, R-3, R-4, and H-8 are shown in Table 3. These examples each have a single glass transition temperature suggesting that R-2, R-3, and R-4 are random copolymers.

TABLE 3

Random Copolymers of hexyl methyl methylene malonate (H3M) and diethyl methylene malonate (DEMM).

|  | Example H-8 | Example R-2 | Example R-3 | Example R-4 |
| --- | --- | --- | --- | --- |
| H3M, g | 1.0 | 0.25 | 0.5 | 0.5 |
| DEMM, g | 0.0 | 0.25 | 0.25 | 0.5 |
| Mn (daltons) | 33,400 | 39,300 | 48,130 | 160,800 |
| Glass transition temp, ° C. | −19.7° C. | 6.6° C. | −0.4° C. | −34.6° C. |
| Conversion of monomer to polymer | ≈100% | ≈100% | ≈100% | ≈100% |

Block Copolymer

Example B-1 is a block copolymer having four polymer blocks including 2 polymer blocks (A blocks) of a first homopolymer and 2 polymer blocks (B blocks) of a second homopolymer. The block copolymer has the structure: A-B-A-B, where each A and B is a polymer block. Block A consists of 2-phenylpropyl methyl methylene malonate. Block B consists of hexyl methyl methylene malonate. A Schlenk flask is passivated with an acid solution, rinsed with methylene chloride, and dried in an oven. About 18 g of tetrahydrofuran is placed in the Schlenk flask. About 0.25 g of monomer A is then added to the flask. The flask is then capped with a rubber septa and submerged halfway in a bath of acetone and dry ice having a temperature of about −78° C. Vacuum was pulled on the flask and then allowed to back fill with nitrogen. The vacuum/nitrogen back fill is repeated at least 3 times. The solution is mixed using a PTFE coated magnetic stir bar. Using a gas-tight microliter syringe, sec-butyllithium is added as an activator. The amount of the activator is chosen so that the molar ratio of the initial monomer to the activator is about 1000:1. After reacting for about 5 minutes, a small aliquot is removed. This aliquot is quenched with trifluoroacetic acid and the molecular weight distribution of the aliquot is measured using gel permeation chromatography. The aliquot is also characterized using NMR spectroscopy. The polymerization is then continued by injecting about 0.25 g of monomer B into the flask using a syringe and reacting for about 5 minutes. A second aliquot is then removed from the flask before adding a third amount of monomer (0.25 g of monomer A) into the flask using a syringe and reacting for about 5 minutes. A third aliquot is then removed from the flask before adding a fourth amount of monomer (0.25 g of monomer B) into the flask using a syringe and reacting for about 5 minutes. A fourth aliquot is then removed. Each aliquot is treated as the first aliquot (i.e., quenched and then characterized by GPC and NMR). The results of each aliquot are shown in Table 4. The final block copolymer is isolated and characterized using differential scanning calorimetry.

TABLE 4

Properties of Example B-1 (block copolymer sample at intermediate stages)

|  | Example B-1 1$^{st}$ aliquot | Example B-1 2$^{nd}$ aliquot | Example B-1 3$^{rd}$ aliquot | Example B-1 4$^{th}$ aliquot |
| --- | --- | --- | --- | --- |
| Monomer A, g | 0.25 | 0.25 | 0.5 | 0.5 |
| Monomer B, g |  | 0.25 | 0.25 | 0.5 |
| Mn, daltons | 28,156 | 41,147 | 59,243 | 67,400 |
| Polydispersity index | 1.06 | 1.07 | 1.06 | 1.07 |
| Conversion of monomer to polymer | ≈100% | ≈100% | ≈100% | ≈100% |

Example S-1 is prepared according to the method of Example H-7 using tetrahydrofuran as the solvent. The resulting polymer has a number average molecular weight of about 2,000,000 daltons. Example S-2 is prepared according to the method of Example S-1, except the solvent is heptane. The resulting polymer has a number average molecular weight of about 500,000 daltons. Example S-3 is prepared according to the method of Example S-1, except the solvent is toluene. The resulting polymer has a number average molecular weight of about 200,000 daltons. Example S-4 is prepared according to the method of Example S-1, except the solvent is dimethoxy ethane. The resulting polymer has a number average molecular weight of about 700,000 daltons. Example S-5 is prepared according to the method of Example S-1, except the solvent is dichloromethane. The resulting polymer has a number average molecular weight of about 150,000 daltons.

Example P-1 and Example P-2 are homopolymers prepared using the method of Example H-1, except the monomer is p-menthyl methyl methylene malonate (4M) and the molar ratio of monomer to activator is about 100:1 for Example P-1 and about 1000:1 for example P-2. The monomer employed in example P-1 has a purity of about 94.1 weight percent and the monomer employed in example P-2 has a purity of about 98.23 weight percent. Example P-1 has a number average molecular weight of about 6,700 daltons, a weight average molecular weight of about 17,400 daltons, a polydispersity index of about 2.60 and a glass transition temperature of about 83° C. Example P-2 has a number average molecular weight of about 1,451,800 daltons, a weight average molecular of about 2,239,300 daltons, a polydispersity index of about 1.62, and a glass transition temperature of about 145° C.

Example P-3 and Example P-4 are homopolymers prepared using the method of Example H-1, except the monomer is fenchyl methyl methylene malonate (F3M) and the molar ratio of monomer to activator is about 100:1. The monomer employed in example P-3 has a purity of about 92.8 weight percent and the monomer employed in example P-2 has a purity of about 98.6 weight percent. Example P-3 has a weight average molecular weight of about 40,300 daltons and a glass transition temperature of about 136° C. Example P-4 has a weight average molecular of about 290,800 daltons and a glass transition temperature of 190° C.

Example X-1, X-2, X-3, and X-4 are all homopolymers prepared using diethyl methylene malonate. The polymers are prepared in solution using tetrahydrofuran as the solvent and using monomer from the same batch. Examples X-1, X-2, and X-3 are prepared in a small scale-reactor to produce about 1 g of polymer. Example X-4 is prepared in a larger reactor for preparing 450 g of polymer. The processing conditions for Examples X-1, X-2, X-3, and X-4 are the same, including the same ratio of monomer to activator, the same reaction time, and the same ambient conditions. Example X-4 is prepared in an 8L round bottom flask and 4.05 kg of solvent was used. After adding the monomer, the flask solvent and monomer are mixed at 500 rpm to form the solution. About 0.103 ml of pure TMG is added as the activator while mixing is continued during the 1 hour reaction time. After 1 hour, the reaction was terminated with TFA and the polymer was isolated using the method of Example H-1 (i.e. precipitated in cold methanol). Over the first 15 minutes, the reaction temperature increased by about 19° C. when preparing Example X-4. The results are shown in Table 5.

TABLE 5

Properties of DEMM polymer at different reactor size

| | Example X-1 | Example X-2 | Example X-3 | Example X-4 |
|---|---|---|---|---|
| DEMM, g | 1 | 1 | 1 | 450 |
| DEMM, weight percent | 10% | 10% | 10% | 10% |
| Mn, daltons | 502,800 | 527,300 | 493,700 | 528,400 |
| Polydispersity index | 2.5 | 2.4 | 2.3 | 2.1 |
| Conversion of monomer to polymer | ≈100% | ≈100% | ≈100% | ≈100% |

The number average molecular weight is generally expected to be highest when using a polar aprotic solvent. Lower number average molecular weights are generally expected to be obtained when using a nonpolar solvent.

REFERENCE SIGNS FROM DRAWINGS

10 Solution polymerization system
12 Solvent
14 Monomer
16 Activator
26 Polymer
30 Illustrative steps included in a solution polymerization process
32 Step of forming a solution including one or more monomers and a solvent
34 Step of adding an activator to begin a polymerization reaction
36 Step of propagating the polymer by an anionic polymerization reaction
37 Optional step of adding one or more monomers and/or continuously feeding one or more monomers (e.g., after substantially all of the previously added monomer has been consumed).
38 Optional step of quenching the polymerization reaction
40 About 6.45 ppm on the NMR spectrograph (corresponding to the reactive double bond peak of diethyl methylene malonate)
42 About 0 ppm on the NMR spectrograph—internal reference
50 GPC peak
51 GPC peak area
52 Weight Average Molecular Weight (Mw)
54 Calibration curve (molecular weight v. retention time) based on PMMA standards
56 58 GPC Curve

What is claimed is:

1. A pressure sensitive adhesive including a polymer comprising
one or more 1,1-disubstituted alkene compounds, wherein the polymer has a weight average molecular weight of about 3000 daltons or more.

2. The pressure sensitive adhesive of claim 1, wherein the polymer includes about 30 weight percent or more of the 1,1-disubstituted alkene compounds, based on the total weight of the polymer.

3. The pressure sensitive adhesive of claim 2, wherein the polymer is a block copolymer.

4. The pressure sensitive adhesive of claim 3, wherein the polymer partially or entirely coats a substrate.

5. The pressure sensitive adhesive of claim 3, wherein
the one or more monomers includes one or more monomers selected from the group consisting of methyl propyl methylene malonate, dihexyl methylene malonate, di-isopropyl methylene malonate, butyl methyl methylene malonate, ethoxyethyl ethyl methylene malonate, methoxyethyl methyl methylene malonate, hexyl methyl methylene malonate, dipentyl methylene malonate, ethyl pentyl methylene malonate, methyl pentyl methylene malonate, ethyl methoxyethyl methylene malonate, ethoxyethyl methyl methylene malonate, butyl ethyl methylene malonate, dibutyl methylene malonate, diethyl methylene malonate (DEMM), diethoxyethyl methylene malonate, dimethyl methylene malonate, di-n-propyl methylene malonate, ethyl hexyl methylene malonate, fenchyl methyl methylene malonate, menthyl methyl methylene malonate, 2-phenylpropyl ethyl methylene malonate, and dimethoxyethyl methylene malonate.

6. The pressure sensitive adhesive of claim 5, wherein the polymer is substantially free of a melting temperature and is substantially free of a glass transition temperature of about 15° C. or more.

7. The pressure sensitive adhesive of claim 3, wherein the polymer is substantially free of a melting temperature and is substantially free of a glass transition temperature of about 15° C. or more.

8. The pressure sensitive adhesive of claim 3, wherein the polymer includes at least one block having a glass transition temperature or melting temperature of about 15° C. or more and at least one different block having no melting temperature above 15° C. and having a glass transition temperature about 0° C. or less.

9. The pressure sensitive adhesive of claim 3, wherein the polymer includes two or more monomers including a first monomer which is a first 1,1-disubstituted alkene compound and a second monomer different from the first monomer.

10. The pressure sensitive adhesive of claim 9, wherein the second monomer is a second 1,1-disubstituted alkene compound.

11. The pressure sensitive adhesive of claim 10, wherein the polymer includes a first polymer block having a first glass transition temperature and a second polymer block having a different glass transition temperature.

12. The pressure sensitive adhesive of claim 11, wherein the second polymer block and the first polymer block have different concentration of monomers.

13. The pressure sensitive adhesive of claim 12, wherein the polymer is a linear polymer.

14. The pressure sensitive adhesive of claim 12, wherein the pressure sensitive adhesive includes a cross-linking agent.

15. The pressure sensitive adhesive of claim 12, wherein the pressure sensitive adhesive includes a plasticizer.

16. The pressure sensitive adhesive of claim 1, wherein the polymer is a random copolymer including two or more monomers including a first monomer that is one of the one or more 1,1-disubstituted alkene compounds and a second monomer, wherein the first monomer is present in an amount of about 30 weight percent or more, based on the total weight of the polymer.

17. The pressure sensitive adhesive of claim 16, wherein the weight ratio of the first monomer to the second monomer is from about 5:95 to about 95:5.

18. The pressure sensitive adhesive of claim 17, wherein the polymer includes two or more 1,1-disubstituted alkene compounds.

19. The pressure sensitive adhesive of claim 18, wherein the polymer is substantially free of a melting temperature and is substantially free of a glass transition temperature of about 15° C. or more.

20. The pressure sensitive adhesive of claim 3, wherein the polymer includes two or more 1,1-disubstituted alkene compounds.

\* \* \* \* \*